US012079223B1

(12) United States Patent
Shah et al.

(10) Patent No.: US 12,079,223 B1
(45) Date of Patent: Sep. 3, 2024

(54) SYSTEMS AND METHODS FOR VISUALIZING ANALYTICS TAGS ASSOCIATED WITH PAGE ELEMENTS OF A WEB PAGE

(71) Applicant: Amazon Technologies, Inc., Seattle, WA (US)

(72) Inventors: Shawn Dhirendra Shah, Lafayette, CA (US); Sharon Shapira, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 181 days.

(21) Appl. No.: 17/548,302

(22) Filed: Dec. 10, 2021

(51) Int. Cl.
*G06F 16/2457* (2019.01)
*G06F 16/28* (2019.01)

(52) U.S. Cl.
CPC ...... *G06F 16/24573* (2019.01); *G06F 16/284* (2019.01)

(58) Field of Classification Search
None
See application file for complete search history.

(56) References Cited

U.S. PATENT DOCUMENTS

| | | | | |
|---|---|---|---|---|
| 7,003,528 | B2* | 2/2006 | Dan | G06Q 10/00 709/224 |
| 9,672,541 | B2* | 6/2017 | Smith | G06F 40/117 |
| 10,776,447 | B2* | 9/2020 | Capon | G06F 40/143 |
| 11,533,357 | B2* | 12/2022 | Yastrebenetsky | G06F 16/951 |
| 2006/0282771 | A1* | 12/2006 | Vinci | G06F 40/143 715/209 |
| 2007/0240037 | A1* | 10/2007 | Law-How-Hung | G06F 3/0482 707/E17.116 |
| 2016/0019600 | A1* | 1/2016 | Smith | G06F 40/166 705/7.29 |
| 2018/0046637 | A1* | 2/2018 | Koopman | G06F 16/9558 |

* cited by examiner

*Primary Examiner* — Ariel Mercado-Vargas
(74) *Attorney, Agent, or Firm* — Lee & Hayes, P.C.

(57) ABSTRACT

Disclosed herein is a tag viewer that can be implemented to overlay content on a web page, such as a web page of a web-based console associated with a service of a service provider network. The tag viewer may determine which page elements of a web page are tagged based on data, such as a data structure, associated with the web page, and may overlay content on the web page, the content including: (i) one or more containers presented around one or more tagged page elements, and (ii) one or more annotations presented in association with the tagged page element(s). Individual annotations that are overlaid on the web page may include a tag type and/or a tag value corresponding to the analytics tag associated with the tagged page element.

20 Claims, 9 Drawing Sheets

SYSTEMS AND METHODS FOR VISUALIZING ANALYTICS TAGS ASSOCIATED WITH PAGE ELEMENTS OF A WEB PAGE

BACKGROUND

Service providers offer cloud-based services to fulfill users' computing-service needs without the users having to invest in and maintain computing infrastructure required to implement the services. These service providers may maintain networks of managed computing resources and functionality to implement various types of on-demand services, such as storage services, compute-power services, database-management services, networking services, and so forth. In this way, service providers maintain service provider networks that provide customers with on-demand delivery of compute power, database storage, applications, and other resources, rather than the customers having to make upfront investments in hardware and spend time and resources managing the hardware. A customer may use a web-based console to access a network-based service of the service provider network. Such a web-based console may be displayed as a web page on a customer device.

The disclosure made herein is presented with respect to these and other considerations.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
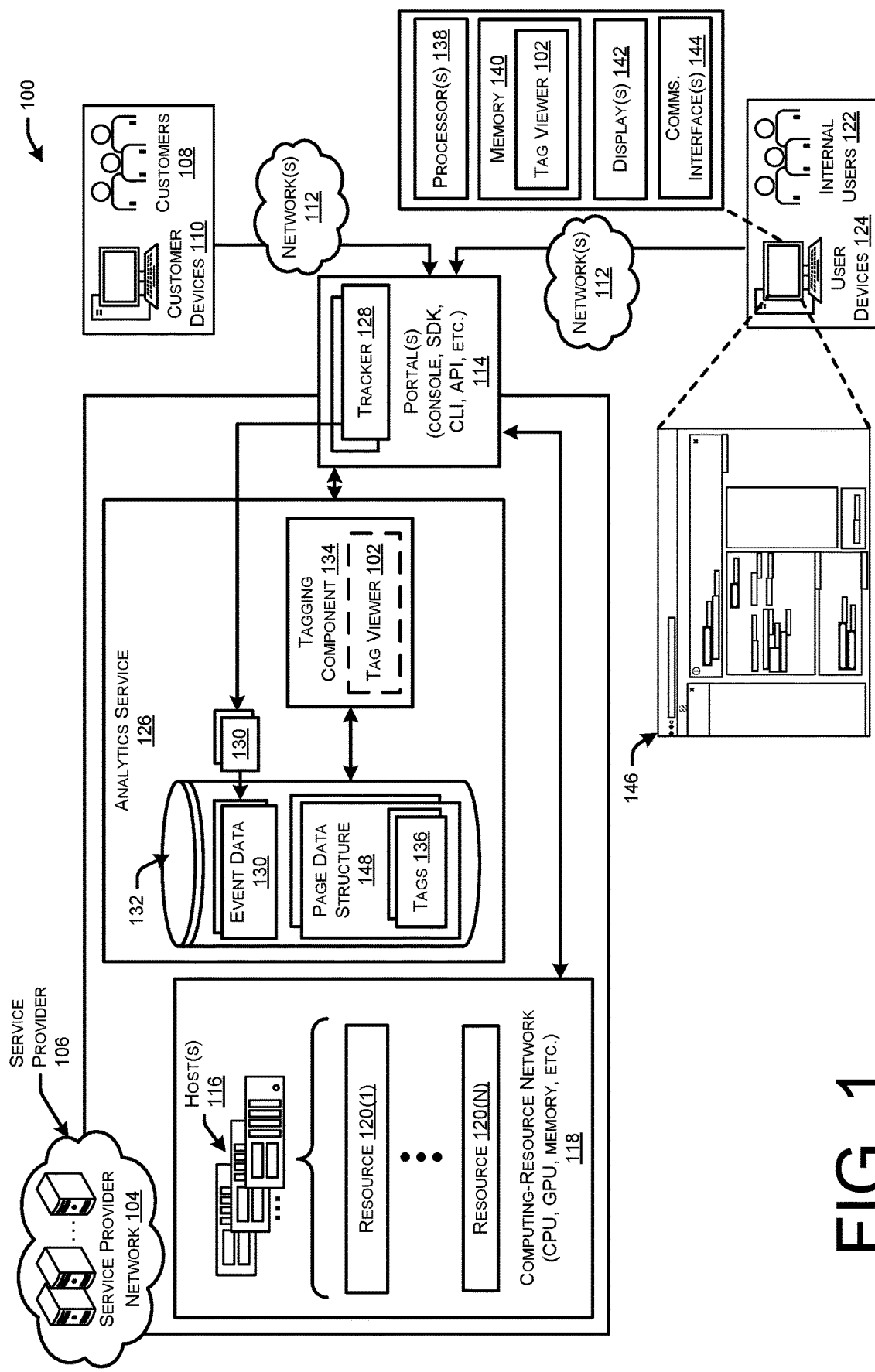
FIG. 1 illustrates a system-architecture diagram of an example environment in which a tag viewer can be implemented to overlay content on a web page of a web-based console.

Service providers offer various network-based (or "cloud-based") services to users to fulfill computing needs of the users. These service providers may operate service provider networks that include clusters of managed servers stored in data centers located across different geographic regions. In this way, users who have subscribed for use of the network-based services (sometimes referred to herein as "customers," or "subscribers") need not invest in and maintain the computing infrastructure required to implement the various services that they may need. Additionally, customers (and sometimes their clients) are able to access these network-based services over different geographic regions. To offer these network-based services across geographic areas, service providers operate and maintain service provider networks (e.g., cloud-based computing environments, network-based service architectures, network-based service infrastructures, etc.). In this way, service provider networks may provide customers with scalable, on-demand, and network-accessible computing platforms over large geographic regions such that the customers have readily-available computing resources at their disposal. These service provider networks allow customers to immediately have computing infrastructure over large geographic regions to fulfill individual computing needs of the customer, and also to provide computing resources to support services provided to clients of the customers.

For example, a customer of the service provider network may be an individual, company, and/or other organization that has an online service that they would like to provide to clients who desire to access the online service. However, the customer may desire to provide access to their online service to clients over large geographic regions, and for a large number of users. The amount of computing infrastructure (e.g., compute power, memory, storage networking, security, etc.) used to support and maintain such an online service over different geographic regions may be large enough to be impractical for customers, particularly new or emerging businesses, to purchase and maintain on their own. Accordingly, service provider networks may provide services, such as compute services, to fulfill the computing-service needs of the customer.

A customer can use a web-based console displayed on a customer device to access network-based services of the service provider network, as well as build cloud-based applications and monitor service usage, among other things. Internal users (e.g., personnel or automated or partially automated services of the service provider) may use various tools to provide a web-based console that delivers a desired customer experience. One of these tools is an analytics service. After obtaining the consent of customers to have their interactions tracked, the analytics service is configured to track the interactions of customers with page elements of the web-based console. For example, a JavaScript® tracker may be used to track interactions of customers with page elements of a web page of a web-based console associated with a particular service of the service provider network. Such a tracker may capture events from various customer interactions to generate event data (sometimes referred to herein as "behavior data," or "analytics data"). In order to make the event data meaningful, a tagging component of the analytics service may allow for page elements to be tagged with tags (sometimes referred to herein as "analytics tags"). This tagging can be done manually by internal users, automatically, or semi-automatically. The tags associated with page elements of a web page allow consumers of the event data to identify the page element that the event data is related to within the web-based console. This allows a team of internal users to better understand the behaviors of customers in order to make data-driven decisions over time about how to change the user interface of the web-based console to improve the customer experience with the web-based console. For example, a team of internal users tasked with improving a web-based console for a domain name system (DNS) service of the service provider network may learn, from the event data generated by the analytics service, that customers are most-frequently interacting with a DNS management section of the web-based console. With this knowledge, the team of internal users may change the user interface of the web-based console in order to increase customer interactions with a domain registration section of the web-based console to drive more domain registrations by customers.

This disclosure describes, among other things, techniques and systems for implementing a tag viewer (sometimes referred to herein as a "tag visualizer" or a "content overlay") to provide a user viewing a web page with a visualization of analytics tags that are associated with page elements of the web page. For example, the web page may represent a page of a web-based console that customers can use to access a service of a service provider network, as well as build cloud-based applications and monitor service usage, among other things. Internal users may have used the above-described tagging component of the analytics service to tag certain page elements (e.g., sections of the web page, buttons, links, etc.) with analytics tags so that consumers of the event data corresponding to tracked customer interactions with the page elements can identify the page elements to which the event data is related. The tag viewer may provide a visualization of these analytics tags by overlaying content on the web page of the web-based console, the content including: (i) one or more containers (e.g., bounding boxes) presented around one or more tagged page elements, and (ii) one or more annotations presented in association with the tagged page element(s). Individual annotations that are overlaid on the web page may include a tag type and/or a tag value corresponding to the tag associated with the page element. The tag viewer may determine which page elements are tagged based on a data structure associated with the web page. In some examples, the tag viewer may display different types (e.g., colors, styles, etc.) of containers and/or annotations based on the types of tags with which the page elements are tagged. Additionally, or alternatively, the containers can be presented in a nested arrangement (e.g., one or more containers within another container) based on the hierarchical nature of the analytics tags. For example, a container presented around a link can be nested within a container presented around a section of the web page that includes that link.

An example process to implement a tag viewer may include receiving a data structure associated with a web page based at least in part on a request to display the web page, wherein the web page is associated with a service of a service provider network. The process may further include determining, based at least in part on the data structure, a page element of the web page that is tagged with a tag, and causing presentation, on a display, of content overlaid on the web page, the content including: (i) a container presented around the page element, and (ii) an annotation presented in association with the page element, the annotation including a tag type and/or a tag value.

The techniques described herein for implementing a tag viewer provides users (e.g., internal users of a service provider) with a visualization of the tag naming schema that has been implemented for the analytics tags that are associated with page elements of a web page, such as a web page of a web-based console. In this manner, an internal user can create reports of customer interactions with the web-based console efficiently and accurately. Internal users can also consume the event data corresponding to tracked customer interactions with the page elements more efficiently, which allows internal users to better understand the behavior of customers with respect to a web-based console and to change the user interface of the web-based console in order to improve the customer experience with the web-based console. The techniques described herein provide a seamless way for users to visualize and understand the underlying event data that is being generated by an analytics service to simplify the determination of relevant event data pertaining to tracked customer interactions. Additionally, the tag viewer described herein can provide a snapshot of how analytics tags have been implemented at any given moment, thereby acting as an accurate source of truth with respect to the current implementation of the analytics tags.

In addition to the aforementioned benefits, computing resources, such as processing resources, memory resources, networking resources, power resources, and the like, may also be conserved by aspects of the techniques and systems described herein. For example, aspects of the techniques and systems described herein conserve memory resources. That is, with the tag viewer providing a visualization of the analytics tags associated with page elements as an overlay on the web-page itself, users no longer have to maintain Wiki pages or other documentation to understand how analytics tags have been implemented with respect to a web page of a web-based console. Such documentation that consumes storage space and becomes quickly outdated if users are not frequently updating the documentation with the current implementation of analytics tags. Other aspects of the techniques and systems described herein provide user interface improvements, such as minimizing the number of user interactions with a user interface when users are generating reports of customer interactions, editing analytics tags, and/or tagging page elements of a web page. For instance, examples described herein provide for presenting an event stream overlaid on a web page, which allows for user selection of an event to generate a report of customer interactions with a page element that corresponds to the selected event. As compared to existing approaches, this allows for generating reports in fewer interactions (e.g., fewer "clicks") with a user interface. Other examples described herein provide for presenting an indication of an improperly-tagged page element and a selectable element to quickly edit the tag associated with the page element, as well as presenting a tag recommendation and a selectable element to quickly add a tag to an untagged or improperly-tagged page element, all from a common browser in which a web page is displayed with a tag viewer enabled. Such user interface improvements help to conserve computing resources.

Also described herein are systems and devices comprising one or more processors and one or more memories, as well as non-transitory computer-readable media storing computer-executable instructions that, when executed by the one or more processors, cause performance of various acts and/or processes disclosed herein. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a tag viewer 102 can be implemented to overlay content on a web page of a web-based console. As illustrated, a service provider network 104 may be operated and/or managed by a service provider 106. The service provider network 104 may provide various services to users to fulfill their computing resource needs, such as cloud-based computing resources. For example, the service provider network 104 may provide cloud-based, scalable, and network accessible (or network-based) compute power services, storage services, database services, networking services, and/or other services.

The service provider network 104 (which may be referred to as a cloud provider network, or sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network, etc.) and the hardware and software in cloud provider data centers that provide those services.

To utilize the network accessible (or network-based) services, customers 108 may utilize customer devices 110 to register for an account (e.g., a customer account, subscriber account, etc.) with one or more of the network-based services. This may allow the customers 108 (sometimes referred to herein as "subscribers" 108) to subscribe to a network-based service, and to provide their own clients with access to online service(s) without the customers 108 having to invest in the computing resources (e.g., on-premise resources) needed to host their own online services. Generally, the customer devices 110 may comprise any type of computing device that may be utilized to access the service provider network 104. For instance, the customer devices 110 may include, without limitation, laptop computers, desktop computers, tablet computers, server computers, mobile phones (e.g., smartphones), gaming systems (e.g., game consoles), televisions, and/or any computing device usable on its own, or in conjunction with other devices, for accessing the service provider network 104.

Customers 108 may utilize the customer devices 110 to access the service provider network 104 over one or more networks 112 (e.g., the Internet, wireless wide area networks (WANs), personal area networks (PANs), wired and/or wireless local area networks (LANs), etc.). The network(s) 112 may comprise any type of network or combination of networks, including wired and/or wireless networks. In some embodiments, the customers 108 can access one or more network-based services of the service provider network 104 via one or more customer portals 114, such as, without limitation, a web-based console, a software-development kit (SDK), a command-line interface (CLI), an application programming interface (API), and/or any other suitable means.

In an illustrative example, the customer 108 may utilize a compute service (e.g., a compute capacity service) of the service provider network 104, which may be fully managed by the service provider 106 and may deploy, operate, and scale compute resources in the cloud-based, or network-based, environment. For example, such a compute service may utilize one or more host computers 116 in a computing-resource network 118 to instantiate one or more computing resources 120, such as virtual machine (VM) instances, allocated to the customer 108. These VM instances can be managed by a script, program, and/or application, etc. In some embodiments, the compute service may provide auto-scaling capabilities such that VM instances can be spun up or spun down based on customer demand. Additionally, or alternatively, the customer 108 may utilize a database service of the server provider network 104, which may deploy, operate, and scale computing resources 120, such as database tables, allocated to the customer 108. These are merely example types of network-based services that the customer 108 can utilize, and others (e.g., storage services, networking services, etc.) are contemplated.

The computing-resource network 118 may include data centers that each include one or more computing resources 120. Computing resources 120 may include, without limitation, data processing resources (e.g., VM instances), database resources (e.g., database tables), storage resources (e.g., storage containers), networking resources, queues, etc. FIG. 1 shows computing resources 120(1)-(N) (collectively 120), where "N" is any positive integer. The data centers of the computing-resource network 118 may house the host computers 116 and may be located across disparate geographical regions such that computing resources are available to support functionality for cloud-based services provided by the service provider network 104. The computing-resource network 118 may include various combinations of hardware-based components, such as central processing units (CPU), graphics processing units (GPU), memory, storage, network capacity, security, and/or any other type of hardware-based resource to support cloud-based services, such as a network-based compute service, database service, storage service, etc. In some examples, the computing resource network 118 may further include respective memories that store various firmware-based and/or software-based resources that provide the functionality of the services, such as the computing resources 120.

Internal users 122 (e.g., personnel of the service provider 106, such as employees, contractors, etc.) may utilize user devices 124 to access the service provider network 104 via the portal(s) 114. This may allow the internal users 122 (sometimes referred to herein as "service team members" 122) to use various tools to provide the customers 108 with a web-based console that delivers a desired customer experience. One of these tools is an analytics service 126. After obtaining the consent of customers 108 to have their interactions tracked, the analytics service 126 uses trackers 128 to track the interactions of customers 108 with page elements of web-based consoles that are used by customers 108 to access services of the service provider network 104. The trackers 128 may be included in, or as part of, the portal(s) 114. In some examples, the trackers 128 may represent JavaScript® trackers, and individual ones of the trackers 128 may be associated with a web page of a web-based console to track interactions of customers 108 with page elements of the corresponding web page. The types of customer interactions that are trackable by the trackers 128 may include, without limitation, view events, click events, where pointers (e.g., mouse pointers, fingers, objects, etc.) are hovering on a web page, what part of the web page is in the viewport displayed on a display of a user device 124, and the like.

As a tracker 128 captures events from various customer interactions, the tracker 128 generates event data 130 (sometimes referred to herein as "behavior data 130," or "analytics data 130") and stores the event data 130 in a data store 132. In order to make the event data 130 meaningful, a tagging component 134 of the analytics service 126 may allow for page elements to be tagged with tags 136 (sometimes referred to herein as "analytics tags 136"). "Tags," as used herein, may represent, and/or include, any suitable data that can be stored in association with a page element of a web page, the data including a tag type and/or a tag value. This tagging can be done manually by internal users 122, automatically, or semi-automatically. The tags 136 associated with page elements of a web page allow consumers of the event data 130 to identify the page element that the event data 130 is related to within the web-based console. This allows a team of internal users 122 to better understand the behaviors of customers 108 in order to make data-driven decisions over time about how to change the user interface of the web-based console to improve the customer experience with the web-based console. For example, a team of internal users 122 tasked with improving a web-based console for a DNS service of the service provider network 104 may learn, from the event data 130 generated by the analytics service 126, that customers 108 are most-frequently interacting with a DNS management section of the web-based console. With this knowledge, the team of internal users 122 may change the user interface of the web-based console in order to increase customer interactions with a domain registration section of the web-based console to drive more domain registrations by customers 108.

FIG. 1 depicts a tag viewer 102 (sometimes referred to herein as a "tag visualizer 102") that may be implemented on a user device 124 of an internal user 122. Additionally, or alternatively, the tag viewer 102 may be implemented remotely from the user device 124, such as by the tagging component 134 of the analytics service 126 executing in the service provider network 104. Generally, the user devices 124 may comprise any type of computing device that may be utilized to access the service provider network 104. For instance, the user devices 124 may include, without limitation, laptop computers, desktop computers, tablet computers, server computers, mobile phones (e.g., smartphones), gaming systems (e.g., game consoles), televisions, and/or any computing device usable on its own, or in conjunction with other devices, for accessing the service provider network 104. In FIG. 1, the individual user devices 124 are shown as being equipped with one or more processors 138 and one or more forms of computer-readable memory 140. In some implementations, the processors(s) 138 may include a CPU, a GPU, both CPU and GPU, a microprocessor, a digital signal processor or other processing units or components known in the art. Additionally, each of the processor(s) 138 may possess its own local memory, which also may store program modules and/or program data. Embodiments of computer-readable memory 140 may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, compact disc read-only memories (CD-ROMs), digital video discs (DVDs), read-only memories (ROMs), random access memories (RAMs), erasable programmable read-only memories (EPROMs), electrically erasable programmable read-only memories (EEPROMs), flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

The individual user devices 124 are also shown as being equipped with a display(s) 142 and a communications interface(s) 144. In this manner, an individual user device 124 is configured to display content via the display(s) 142 and to transmit/receive data over the network(s) 112 via the communications interface(s) 144. The communications interface(s) 144 may implement one or more of various wireless technologies, such as Wi-Fi, Bluetooth, radio frequency (RF), and so on. It is to be appreciated that the user devices 124 may further include physical ports to facilitate a wired connection to the network 112, a connected peripheral device, or a plug-in network device that communicates with other wireless networks.

The computer-readable memory 140 may be used to store any number of functional, or executable, components, such as programs and program modules that are executable on the processor(s) 138 to be run as software. Each component stored in the computer-readable memory 140 may comprise computer-executable instructions that, when executed, cause the one or more processors 138 to perform acts and to implement techniques described herein. Each component may be in the form of data structures, program modules, or other data. The components included in the computer-readable memory 140 of a user device 124 may include the tag viewer 102. In some examples, the tag viewer 102 is implemented as a browser extension, a plugin, or the like. In other examples, the tag viewer 102 is implemented as part of a client application executable by the one or more processors 138. In examples where the tag viewer 102 is implemented remotely from the user device 124, the tag viewer 102 may be executed by a server, such as a server computer of the service provider network 104.

In the example of FIG. 1, an internal user 122 may be viewing a web page 146 displayed on the display(s) 142 of a user device 124. In this example, the web page 146 may be displayed within a browser with the tag viewer 102 enabled. In some examples, the tag viewer 102 may be enabled by default as an "always on" feature. In other examples, an internal user 122 may enable and disable the tag viewer 102 by providing user input to the user device 124, such as by clicking on an "enable" button or a "disable" button. In some examples, the tag viewer 102 may be configurable through settings. For example, an internal user 122 may configure the tag viewer 102 to be enabled and disabled via user input (e.g., clicking on a button), and/or the internal user 122 may configure the tag viewer 102 to overlay, on the web page 146, content that pertains to a particular type(s) of tag 136.

In general, the tag viewer 102 causes content to be overlaid on the web page 146 to provide an internal user 122 with a visualization of the analytics tags 136 that are associated with page elements of the displayed web page 146. For example, the web page 146 may represent a page of a web-based console that customers 108 can use to access a service of a service provider network 104, as well as build cloud-based applications and monitor service usage, among other things. Internal users 122 may have used the tagging component 134 of the analytics service 126 to tag certain page elements (e.g., sections of the web page 146, buttons, links, etc.) with analytics tags 136 so that consumers of the event data 130 corresponding to tracked customer interactions with the page elements can identify the page elements to which the event data 130 is related. The tag viewer 102 may provide a visualization of these analytics tags 136 by overlaying content on the web page 146 of the web-based console, the content including: (i) one or more containers (e.g., bounding boxes) presented around one or more tagged page elements, and (ii) one or more annotations presented in association with the page element(s), wherein the individual annotations include a tag type and/or a tag value corresponding to the tag 136 associated with the page element. The containers and the annotations that are overlaid on the web page 146 are described in more detail below with reference to the following figures.

FIG. 1 depicts that individual web pages, such as the web page 146, may be associated with an underlying data structure 148 (or "page data structure 148"), which represents the underlying data for the content (e.g., page elements) of the web page 146. For example, the web page 146 may include various page elements, such as sections, buttons, links, text, images, videos, animations, and/or any other suitable page element. In some examples, the page data structures 148 represent, or include, Document Object Models (DOMs) for the associated web pages with which customers 108 interact, such as the web page 146. Tags 136 can be implemented as a property on nodes within the page data structures 148. In this sense, the tags 136 can be embedded at the page level within the page data structure 148 (e.g., a DOM). In other examples, tags 136 associated with a web page 146 can be determined by the tag viewer 102 issuing an application programming interface (API) call(s) to an external service that associates tags 136 with page elements of web pages.

In some examples, tags 136 are hierarchical in nature. For example, a first tag 136 can be associated with a web page, such as the web page 146, a second tag 136 can be associated with a section of the web page, a third tag 136 can be associated with a button, a link, or text within the section of the web page, and so on and so forth. Internal users 122 may use the tagging component 134 of the analytics service 126 to tag certain flows of interest to understand how customers 108 are progressing from one page element to the next within a web page 146 and/or to understand how customers 108 are progressing from one web page to the next.

The tag viewer 102 may determine which page elements of a web page 146 are tagged based on the data structure 146 associated with the web page 146. For example, in response to an internal user 122 navigating a browser to the web page 146, the tag viewer 102 may submit a query for page elements of the web page 146 that are tagged within the data structure 148, and the tag viewer 102 may receive a list of the page elements based on submitting the query. The tag viewer 102 may cause containers (e.g., bounding boxes) to be presented around the tagged page elements as an overlay on the web page 146. Furthermore, the tag viewer 102 may cause annotations to be presented in association with the tagged page elements, the annotations including a tag type and/or a tag value of the relevant tag 136. In this way, the internal user 122 who is viewing the web page 146 can be provided with a visualization of the tag naming schema that has been implemented for the analytics tags 136 that are associated with page elements of the web page 146. This allows the internal user 122 to create reports of customer interactions with the web page 146 efficiently and accurately. In some examples, the tag viewer 102 may display different types (e.g., colors, styles, etc.) of containers and/or annotations based on the types of tags 136 with which the page elements are tagged. Additionally, or alternatively, the containers can be presented in a nested arrangement (e.g., one or more containers within another container) to reflect the hierarchical nature of the analytics tags 136. With such a visualization, the internal user 122 who is viewing the web page 146 can consume the event data 130 corresponding to tracked customer interactions with the page elements more efficiently, which allows the internal user 122 to better understand the behavior of customers 108 with respect to a web-based console and to change the user interface of the web-based console in order to improve the customer experience with the web-based console.

Figure 2:
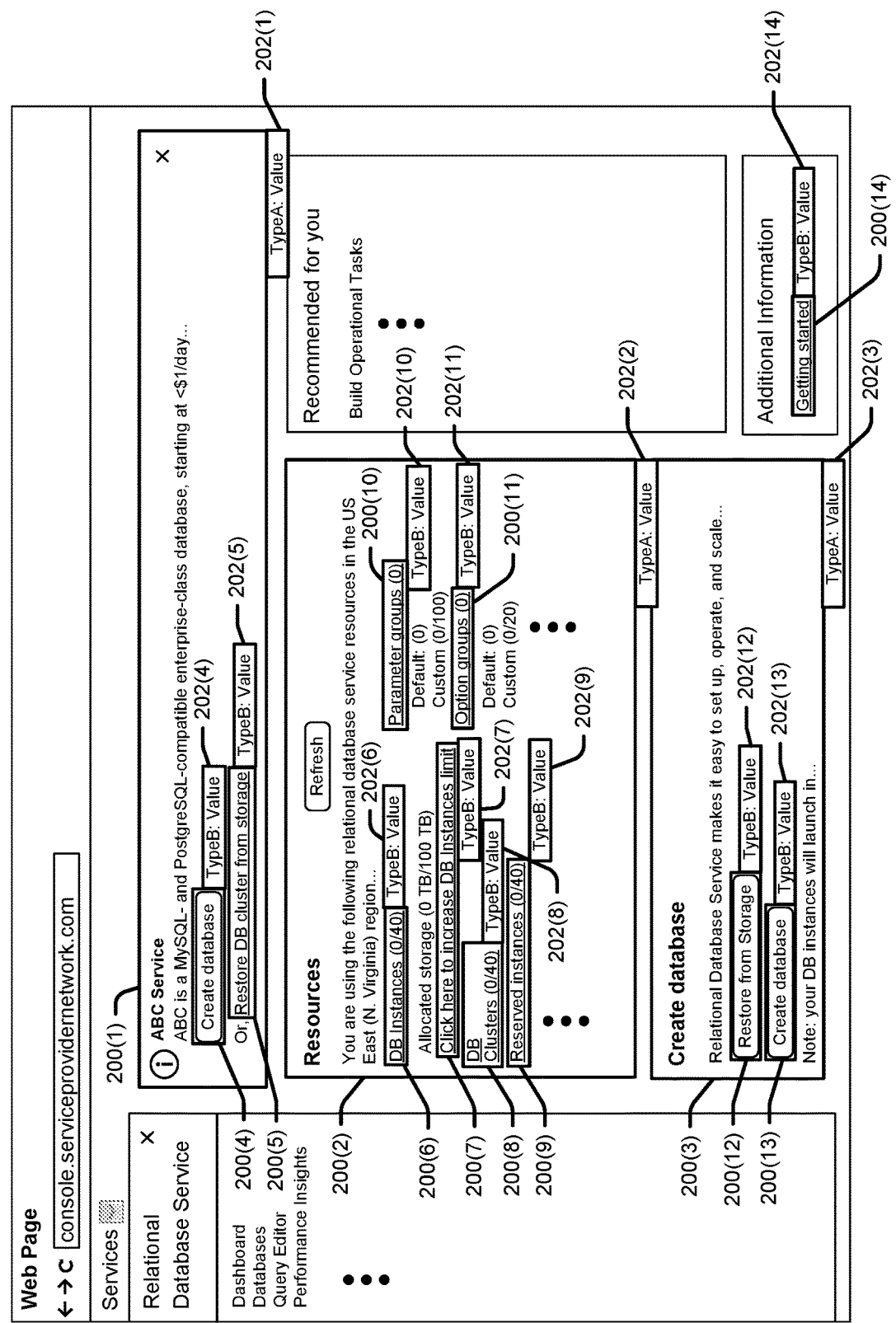
FIG. 2 illustrates an example web page displayed within a browser with a tag viewer enabled, the tag viewer causing content to be overlaid on the web page.

FIG. 2 illustrates an example web page 146 displayed within a browser (e.g., a web browser) with a tag viewer 102 enabled. The web page 146 may represent a web page of a web-based console that customers 108 may use to access a relational database service of the service provider network 104. It is to be appreciated, however, that the web page 146 can represent any suitable type of web page, such as a documentation web page, a marketing web page, or any other suitable type of web page 146. Customers 108 may interact with page elements of the web page 146 in various ways by using an input device (e.g., a mouse, a touch screen, etc.). For example, customers 108 may select buttons, links, or the like, and/or customers 108 may hover a pointer over page elements, among other possible customer interactions.

Although a web browser implementation is depicted in FIG. 2, it is to be appreciated that the tag viewer 102 can be implemented in other ways, such as by implementing the tag viewer 102 via a client application. Furthermore, the tag viewer 102 can be implemented on the client side (e.g., as a browser extension, a plugin, a client application, etc.) or on the server side, or a combination thereof. When the tag viewer 102 is enabled, the tag viewer 102 causes content to be overlaid on the web page 146. Such content may include, without limitation, containers 200 (e.g., bounding boxes) and annotations 202. The containers 200 and the annotations 202 may be associated with the tags 136. As described above page elements of the web page 146 may be tagged with the tags 136, and this can be done manually by internal users 122, automatically, or semi-automatically.

The containers 200 are overlaid on the web page 146 such that the containers 200 are presented around a corresponding page element. For example, the "Resources" section of the web page 146 may have been tagged with a tag 136 having a tag type and a tag value. The tag types illustrated in FIG. 2 include two example types of tags: (i) TypeA and (ii) TypeB. These are merely example tag types to illustrate that there can be different types of tags. Accordingly, the "Resources" section of the web page 146 may have been tagged with a tag 136 having a tag type of "TypeA" and a particular tag value. In this example, as shown in FIG. 2, the tag viewer 102 may cause presentation, on the display(s) 142 of a user device 124, of content overlaid on the web page 146, the content including: (i) a container 200(2) presented around the "Resources" section of the web page 146, and (ii) an annotation 202(2) presented in association with the "Resources" section (e.g., the annotation 202(2) may be presented within or next to the container 200(2)). Here, the annotation 202(2) includes the tag type of "TypeA" and the particular tag value of the tag 136, which the internal user 122 who is viewing the web page 146 can use to determine the tag naming schema that was used for the "Resources" section, which was tagged for purposes of tracking customer interactions with the "Resources" section of the web page 146. Similarly, a container 200(3) is presented around the "Create database" section of the web page 146, and an annotation 202(3) is displayed in association with the "Create database" section, the annotation 202(3) including the same tag type of "TypeA" and another particular tag value of the tag 136 associated with the "Create database" section. The tag type of "TypeA" denotes that the "Resources" section and the "Create database" section have each been tagged with respective tags 136 that are on the same level of the tag hierarchy. In other words, the tag type may signal the level of a tag 136 within a tag hierarchy. It is to be appreciated that, while a container 200 may be associated with a given page element of the web page 146, the container 200 may be presented around one page element or multiple page elements of the web page 146. For example, the container 200(2) is associated with the "Resources" section of the web page 146 and is therefore presented around the "Resources" section. In addition, the container 200(2) is presented around other page elements (e.g., links, buttons, etc.) that are within the "Resources" section. In this sense, the container 200(2) is presented around multiple page elements of the web page 146 by virtue of the container's 200(2) association with a tag 136 applied to the "Resource" section. Meanwhile, a container 200(12) is presented around the "Restore from Storage" button within the "Create database" section of the web page 146, and an annotation 202(12) is displayed in association with the "Restore from Storage" button, the annotation 202(12) including a different tag type of "TypeB" and another particular tag value of the tag 136 associated with the "Restore from Storage" button. The tag type of "TypeB" denotes that the "Restore from storage" button and the "Create database" section have each been tagged with respective tags 136 that are on different levels of the tag hierarchy. To help visualize this, the container 200(12) is presented within the container 200(3) based at least in part on the different tag types of the respective tags 136. In other words, the container 200(12) is nested within the container 200(3). FIG. 2 illustrates a plurality of containers 200(1)-(14) presented around tagged page elements of the web page 146 and a plurality of annotations 202(1)-(14) presented in association with the tagged page elements. It is to be appreciated, however, that the number and/or types of containers 200 and annotations 202 can vary on any given web page. Furthermore, the terms "container", "content container", "bounding box", "box", "content box", "module", "content module", "block", "content block", "tile", "content tile", "region", "content region", "area", and/or "content area" may be used interchangeably herein to refer to reference numeral 200 in the various Figures, which is a bounded display element in which a tagged page element of a web page can be presented.

The shape of the containers 200 is non-limiting. For example, the containers 200 depicted in FIG. 2 are shown as boxes having a rectangular shape, although it is to be appreciated that the containers 200 can be of any shape including, without limitation, rectangular, circular, triangular, or any other polygonal shape. Furthermore, the shapes of the containers 200 overlaid on a web page 146 may be uniform/homogenous (e.g. all of the containers 200 may be the same type of shape, such as rectangular-shaped containers 200), or the shapes of the containers 200 may be heterogeneous (e.g., some containers 200 may be rectangular, while others may be circular, etc.).

The containers 200 and/or the annotations 202 can be overlaid on the web page 146 in a variety of colors and/or styles. In some examples, containers 200 associated with tags 136 of the same tag type may be presented in the same color and/or style. Accordingly, in the example of FIG. 2, the containers 200(1)-(3) and/or the annotations 202(1)-(3) may be presented in the same color (e.g., green) and/or style. "Style" can mean aline type (e.g., dashed line vs. solid line), line weight, shape (e.g., rectangular vs. circular), or any other suitable style. Meanwhile, the containers 200(4)-(14) and/or the annotations 202(4)-(14) may be presented in the same color (e.g., blue) and/or style, yet a different color and/or style than the containers 200(1)-(3) and/or the annotations 202(1)-(3). This allows a viewing user to easily distinguish between page elements that are tagged with different types of tags 136.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
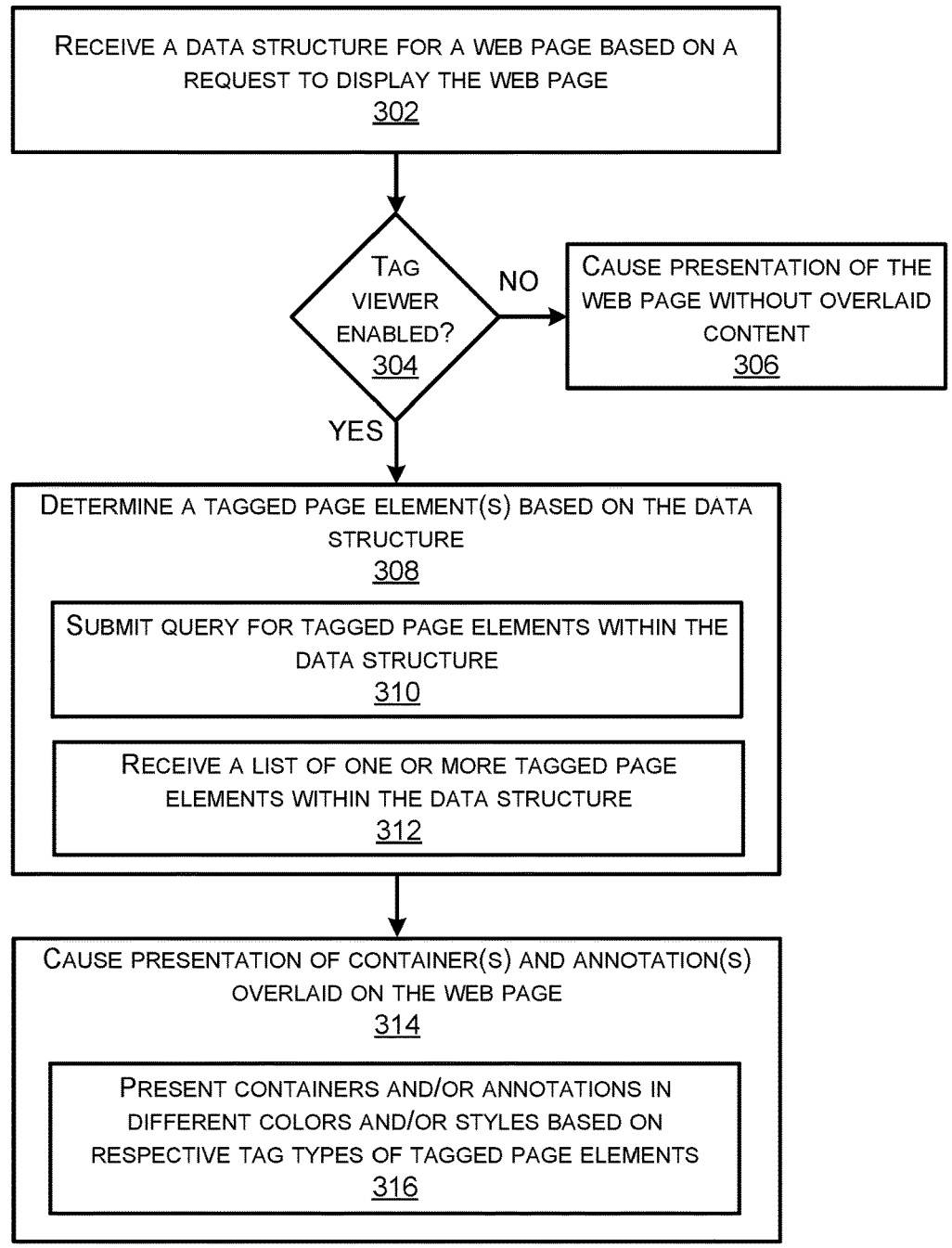
FIG. 3 illustrates a flow diagram of an example process for implementing a tag viewer on a web page to overlay content on the web page.

FIG. 3 illustrates a flow diagram of an example process 300 for implementing a tag viewer 102 on a web page 146 to overlay content on the web page 146. For discussion purposes, the process 300 is described with reference to the previous figures. It is to be appreciated that the process 300 may be performed on a client-side device, a server-side device, or a combination thereof. For example, the process 300, or one or more steps thereof, may be performed on the client-side by a processor(s) 138 executing a browser extension, a plugin, a client application, or the like. Additionally, or alternatively, the process 300, or one or more steps thereof, may be performed on the server-side by a processor(s) executing computer-executable instructions on a server computer(s) (e.g., a server computer(s) of the service provider network 104).

At 302, a processor(s) (e.g., the processor(s) 138 of a user device 124) may receive a data structure 148 associated with a web page 146 based at least in part on a request to display the web page 146. In some examples, receiving a data structure at block 302 may include analyzing data associated with the web page 146. The web page 146 may be associated with a service of a service provider network 104. For example, an internal user 122 may operate a user device 124 to navigate a browser to a website for a web-based console of a DNS service, a relational database service, or another type of service of the service provider network 104. This navigation of the browser to the website may cause the user device 124 to send a request to a server requesting to display a web page 146 of the web-based console. In response to the request to display the web page 146, the processor(s) may receive a data structure 148 associated with the web page 146. In some examples, the data structure 148 (or data) represents, or includes, a DOM for the web page 146. The data structure 148 may include tags 136 associated with tagged page elements of the web page 146, such as sections of the web page 146, buttons, links, etc.

At 304, the processor(s) may determine whether a tag viewer 102 is enabled. It is to be appreciated that the tag viewer 102 may be enabled by default as an "always on" feature. In other examples, an internal user 122 may enable and disable the tag viewer 102 by providing user input to the user device 124, such as by clicking on an "enable" button or a "disable" button from a menu or the like. That is, the processor(s) may receive a request to enable the tag viewer 102 at block 304 based on user input, and the processor(s) may actively enable the tag viewer 102 at block 304. In some examples, the tag viewer 102 may be configurable through settings. For example, an internal user 122 may configure the tag viewer 102 to be enabled and disabled via user input (e.g., clicking on a button). If the tag viewer 102 is disabled at block 304, the process 300 may follow the NO route from block 304 to block 306 where the processor(s) may cause presentation of the web page 146 without any content overlaid on the content of the web page 146. That is, the web page 146 may be displayed at block 306 without the containers 200 and the annotations 202 depicted in FIG. 2. If the tag viewer 102 is enabled at block 304, the process 300 may follow the YES route from block 304 to block 308.

At 308, the processor(s) may determine, based at least in part on the data structure 148 (and/or based at least in part on analyzing the data associated with the web page 146), a page element(s) of the web page 146 that is tagged with a tag 136. In some examples, tags 136 can be implemented as a property on nodes within the page data structures 148 (e.g., data-analytics-type="TypeA"; data-analytics="Value"). Accordingly, the processor(s) may analyze the data structure 148 to identify tags 136 embedded within the page data structure 148. As shown by sub-blocks 310 and 312, this may involve submitting a query and receiving query results.

At sub-block 310, the processor(s) may submit a query for page elements of the web page 146 that are tagged within the data structure 148. For example, the processor(s) may query the data structure 148 for the web page 146 to return a list of tagged page elements. The query may involve extracting the tag properties, like tag type, tag value, etc., from the nodes in the underlying data structure 148 where the tags 136 are implemented and outputting that extracted information in a list of query results.

At sub-block 312, the processor(s) may receive a list of tagged page elements based at least in part on the submitting of the query at sub-block 310. The list received at sub-block 312 may include one or more tagged page elements, as well as tag properties of the tags 136, such as tag type, tag value, etc. In some examples, the list received at sub-block 312 may include properties of the content that the tag viewer 102 is configured to overlay on the web page 146, such as a color and/or a style of the containers 200 and/or the annotations 202 that are to be presented in association with the tagged page elements.

At 314, the processor(s) may cause presentation, on a display(s) 142, of content overlaid on the web page 146. The content overlaid on the web page 146 may include, without limitation, containers 200 and annotations 202, as described herein. For example, with respect to a tagged page element, such as the "Create database" button within the "ABC Service" section of the web page 146 depicted in FIG. 2, the content that is overlaid on the web page 146 at block 314 may include a container 200(4) presented around the tagged page element (e.g., the "Create database" button), and an annotation 202(4) presented in association with the tagged page element, the annotation 202(4) including a tag type (e.g., tag type=TypeB) and a tag value. In some examples, individual annotations 202 can include any suitable metric associated with interactions of a user(s) (e.g., a customer(s) 108) with the associated page element, such as a number of clicks, a number of views, or the like. In some examples, the internal user 122 may configure the tag viewer 102 to overlay, on the web page 146, content that pertains to a particular type(s) of tag 136. As such, the content overlaid on the web page 146 at block 314 may include containers 200 and annotations 202 associated with a first tag type (e.g., tag type=TypeA) and may omit (or exclude) containers 200 and annotations 202 associated with a second tag type (e.g., tag type=TypeB) different than the first tag type.

Containers 200 may be presented in a nested arrangement at block 314. For example, the content overlaid on the web page 146 at block 314 may include a container 200(5) presented around a tagged page element (e.g., a "Restore DB cluster from storage" link), and the container 200(5) may be presented (or "nested") within a larger container 200(1) that is presented around another tagged page element (e.g., an "ABC Service" section of the web page 146). This "nesting" of the containers 200(1) and 200(5) may be based at least in part on the respective page elements being tagged with tags 136 having different tag types. That is, the "ABC Service" section of the web page 146 may be tagged with a first tag 136 having a first tag type (e.g., tag type=TypeA), and the "Restore DB cluster from storage" link may be tagged with a second tag 136 having a second tag type (e.g., tag type=TypeB), and based on these differing tag types, the container 200(5) may be nested within the container 200(1).

At sub-block 316, the processor(s) may present containers 200 and/or annotations 202 in different colors and/or styles based on the respective tag types of the tags 136 associated with the tagged page elements. For example, the processor(s) may determine at least one of a color or a style of a container 200 and/or an annotation 202 associated with a tagged page element based at least in part on a tag type of the tag 136 associated with the page element. In the running example, the processor(s) may determine that the "Restore DB cluster from storage" link is tagged with a tag 136 having a tag type of "TypeB," and based on this tag type, the processor(s) may determine that the container 200(5) is to be presented around the "Restore DB cluster from storage" link in the color blue and/or in the style of a box with a solid line, and this may be a different color and/or style than that of the container 200(1) because the "ABC Service" section of the web page 146 may be tagged with a tag 136 having a different tag type of "TypeA."

In one example implementation of the process 300, a user (e.g., an internal user 122) requesting to view a web page 146 with a tag viewer 102 enabled may see the web page 146 depicted in FIG. 2 displayed on a display(s) 142 of a user device 124, the tag viewer 102 causing content to be overlaid on the web page 146, the content including one or more containers 200 presented around tagged page elements, and one or more annotations 202 presented in association with the tagged page elements. In this way, a user who is viewing the web page 146 can be provided with a visualization of the tag naming schema that has been implemented for the analytics tags 136 that are associated with page elements of the web page 146. This allows the internal user 122 to create reports of customer interactions with the web page 146 efficiently and accurately. With such a visualization, the internal user 122 who is viewing the web page 146 can consume the event data 130 corresponding to tracked customer interactions with the page elements more efficiently, which allows the internal user 122 to better understand the behavior of customers 108 with respect to a web-based console and to change the user interface of the web-based console in order to improve the customer experience with the web-based console.

Figure 4:
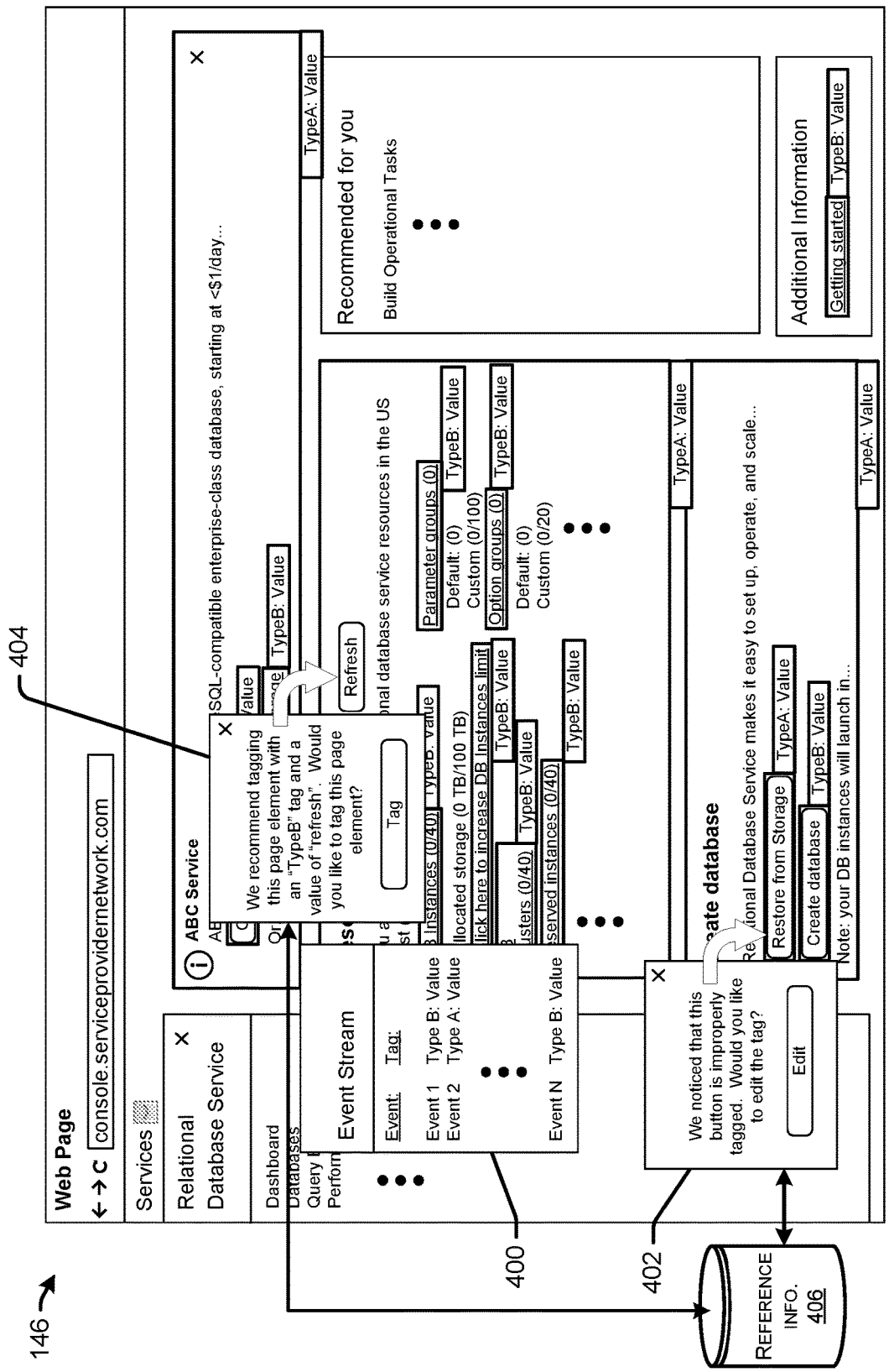
FIG. 4 illustrates an example web page displayed within a browser with a tag viewer enabled, the tag viewer causing content to be overlaid on the web page, wherein the content depicted in FIG. 4 includes an event stream, an indication of an improperly-tagged page element, and a tag recommendation.

FIG. 4 illustrates an example web page 146 displayed within a browser (e.g., a web browser) with a tag viewer 102 enabled. The web page 146 depicted in FIG. 4 is similar to the web page 146 depicted in FIG. 2 in that the web page 146 depicted in FIG. 4 may represent a web page of a web-based console that customers 108 may use (e.g., interact with) to access a relational database service of the service provider network 104, and containers and annotations (the containers and the annotations are not labeled in FIG. 4 for clarity) associated with tagged page elements are included in the content that is overlaid on the web page 146.

The web page 146 depicted in FIG. 4 differs from the web page 146 depicted in FIG. 2 in that the tag viewer 102, when enabled, causes additional content to be overlaid on the web page 146. This additional content overlaid on the web page 146 includes an event stream 400 (sometimes referred to herein as a "stream of events 400"), an indication 402 of an improperly-tagged page element, and a tag recommendation 404. Each are discussed in turn.

The event stream 400 pertains to the event data 130 that is tracked by the tracker 128 and stored in the data store 132. As noted above, after obtaining the consent of customers 108 to have their interactions tracked, the analytics service 126 uses trackers 128 (e.g., JavaScript® trackers) to track the interactions of customers 108 with page elements of web-based consoles that are used by customers 108 to access services of the service provider network 104. One of these trackers 128 may be associated with the web page 146 of a web-based console associated with a relational database service, as depicted in FIG. 4. Accordingly, the tracker 128 associated with the web page 146 depicted in FIG. 4 may track interactions of customers 108 with page elements of the web page 146.

As the tracker 128 captures events from various customer interactions, the tracker 128 generates event data 130 and stores the event data 130 in the data store 132. Because particular page elements of the web page 146 are tagged with analytics tags 136, the tagged page elements that the event data 130 is related to within the web-based console can be readily identified. In the example of FIG. 4, the tag viewer 102, when enabled, may cause an event stream 400 pertaining to the tracked event data 130 to be overlaid on the web page 146. Accordingly, an internal user 122 who is viewing the web page 146 with the tag viewer 102 enabled can see the event stream 400.

In some examples, a user device 124 that is displaying the web page 146 of FIG. 4 with the tag viewer 102 enabled may receive a stream of the event data 130 that is associated with tagged page elements of the web page 146. That is, the tag viewer 102 executing on a user device 124 may subscribe to an event stream, and, based on the event subscription, the analytics service 126 may filter the events data 130 in the data store 132 on the tagged page elements for the web page 146 that is currently being displayed on the user device 124, and may send the filtered event data 130 to the user device 124. Accordingly, the event stream 400 may present a "live" stream of event records (e.g., "Event 1, Event 2, . . . , Event N) that pertain to the filtered event data 130 received by the user device 124. In other words, as new event data 130 is streamed to the user device 124, the event records presented in the event stream 400 may be updated with new event records. For example, the list of event records in the event stream 400 window may scroll down as new event data 130 is received by the user device 124 with the newest event records at the top of the list. Alternatively, the event records may be organized in other ways, such as event records organized by tagged page element, oldest-to-newest event records, or the like. In some examples, the event data 130 can be processed by the analytics service 126 before it is streamed to the user device 124, and/or the user device 124 may process the streamed event data 130 using various data processing techniques, such as time series analysis, funnel analysis, etc. This may allow for presenting the event data 130 the event stream 400 according to certain flows of interest to understand how customers 108 are progressing from one page element to the next within the web page 146, for example.

With the event stream 400 overlaid on the web page 146, an internal user 122 can see what events corresponding to customer 108 interactions with the web page 146 are being recorded by the analytics service 126. This event stream 400 may allow an internal user 122 to validate that the tagging of page elements has been implemented correctly. That is, the event stream 400 may allow the internal user 122 to visualize the customer interactions that are being tracked by the analytics service 126 to validate its accuracy and/or to make sure that the expected event data 130 is being collected. For example, the event stream 400 may include the analytics tags 136 (e.g., tag type and tag value) associated with individual event records so that the internal user 122 can find the annotation 202 with a matching tag 136 (e.g., the same tag type and tag value) to confirm (visually) that a customer interaction with the corresponding page element has been tracked by the analytics service 126. In some examples, the tags 136 and/or the event records in the event stream 400 can be color-coded to match the color-coding of the containers 200 and/or the annotations 202 presented as an overlay on the web page 146. This may allow the internal user 122 to locate an annotation 202 with a matching tag 136 more quickly.

In some examples, the event stream 400 overlaid on the web page 146 may present events that correspond to the interactions of a viewing user 122 with page elements of the web page 146. That is, as a user (e.g., an internal user 122) who is viewing the web page 146 is interacting with (e.g., clicking on, hovering a pointer over, etc.) particular page elements, the event stream 400 may present a recorded stream of event records corresponding to those interactions so that the internal user 122 can validate that the tagging of page elements has been implemented correctly based on his/her own interactions with the web page 146.

In the example of FIG. 4, the event stream 400 is overlaid on the web page 146 as a window. In some examples, the event stream 400 window is presented in response to loading the web page 146, and the event stream 400 may be persistently presented as an overlay while the tag viewer 102 is enabled after loading the web page 146. In some examples, the event stream 400 window may be a pop-up window that is presented in response to a detected user input, such as user input corresponding to a pointer (e.g., a mouse pointer, a finger, an object, etc.) hovering over and/or selecting a button on the web page 146. In these examples, the event stream 400 may include the filtered event data 130 pertaining to all or substantially all of the tagged page elements of the web page 146. In other examples, the event stream 400 may be filtered on particular tagged page elements of the web page 146. For example, if a pointer hovers over a particular page element that is tagged with an analytics tag 136, the event stream 400 window may pop-up and may present event records associated with event data 130 corresponding to customer interactions with the page element over which the pointer is hovering. Accordingly, an internal user 122 can traverse the web page 146 by hovering over different tagged page elements to selectively view a stream of event data 130 associated with the particular page element of interest to the internal user 122. In some examples, the event stream 400 can be overlaid on the web page 146 as a "heat map" that associates tracked event data 130 with tagged page elements in a spatial sense. For example, the event stream 400 may be presented as icons that are overlaid on the web page 146 near (e.g., within a threshold distance from) tagged page elements, and in response to a pointer hovering over and/or selecting an icon next to a tagged page element, an event stream 400 window may pop-up to present event records associated with event data 130 corresponding to customer interactions with that page element. In some examples, a user may provide user input to enable or disable the event stream 400, wherein the event stream 400 is presented as an overlay on the web page 146 when the event stream 400 is enabled and the event stream 400 is not presented when the event stream 400 is disabled. In some examples, the event stream 400 may be configurable through settings. For example, an internal user 122 may configure the event stream 400 to be enabled and disabled via user input (e.g., clicking on a button).

When the tag viewer 102 is enabled, the indication 402 of an improperly-tagged page element may be overlaid on the web page 142 in response to determining that the page element is improperly tagged. This determination may be based at last in part on reference information 406 for tagging page elements of web pages. In some examples, such reference information 406 may be built over time as internal users 122 use the tagging component 134 to tag page elements of web pages with analytics tags 136. For example, as page elements are tagged, tagged page elements may be grouped into groups of similar page elements (e.g., based on aspects or features of the page elements), and the tags 136 of each group of tagged page elements may be analyzed to determine a common attribute of the tags 136. Accordingly, the reference information 406 for tagging page elements may be used to identify tagged page elements on the web page 146 depicted in FIG. 4, and to determine whether a tag 136 associated with the identified page element includes an attribute in common with similar page elements of other web pages 146. For example, the reference information 406 for tagging page elements may indicate that other web pages 146 include buttons that are similar to the "Restore from Storage" button of the web page 146 depicted in FIG. 4, and most of the analytics tags 136 associated with those buttons may have a tag type of "TypeB". Accordingly, in response to determining that the "Restore from Storage" button is tagged with a tag 136 having a tag type of "TypeA," the tag viewer 102 may cause the indication 402 of an improperly-tagged page element to be overlaid on the web page 142. In other examples, the reference information 406 for tagging page elements may include a tagging scheme created by an internal user 122, and if the tag 136 associated with a particular page element is inconsistent with the tagging scheme (e.g., if the tagging scheme indicates that buttons within sections of the web page 146 are to be tagged with tags 136 having a tag type of "TypeB"), then the tag viewer 102 may cause the indication 402 of an improperly-tagged page element to be overlaid on the web page 142.

In the example of FIG. 4, the indication 402 of an improperly-tagged page element is overlaid on the web page 146 as a window, and the indication 402 includes a selectable element (e.g., an "Edit" button) that, upon selection, allows an internal user 122 to edit the analytics tag 136 associated with the page element (e.g., to change the tag type to "TypeB"). In other examples, the indication 402 of an improperly-tagged page element may be presented in other ways, such as by highlighting the page elements with a particular color (e.g., red), presenting an icon (e.g., a red flag) next to the page element, or the like. Accordingly, the tag viewer 102, in some examples, can act as a tag evaluator by checking the tags 136 applied to page elements to determine if the tags 136 are improper, which may "confuse" the analytics service 126 and/or lead to "bad" event data 130. In some examples, a user may provide user input to enable or disable a tag evaluator, wherein the improper tag indication 402 is presented as an overlay on the web page 146 when the tag evaluator is enabled and the improper tag indication 402 is not presented when the tag evaluator is disabled. In some examples, such a tag evaluator may be configurable through settings. For example, an internal user 122 may configure the tag evaluator to be enabled and disabled via user input (e.g., clicking on a button).

When the tag viewer 102 is enabled, the tag recommendation 404 may be overlaid on the web page 142 in response to determining that an untagged page element of the web page 146 is a type of page element that has been tagged with a particular tag type. Alternatively, the tag recommendation 404 may be overlaid on the web page 142 in response to determining a proper tag type for an improperly-tagged page element. These determinations may be based at last in part on the above-described reference information 406 for tagging page elements of web pages. For example, a determination can be made that buttons similar to the "Refresh" button of the web page 146 depicted in FIG. 4 are frequently tagged with tags 136 having a tag type of "TypeB." Accordingly, the tag recommendation 404 may recommend tagging the untagged "Refresh" button with a tag 136 having a tag type of "TypeB." Additionally, or alternatively, the tag recommendation 404 may recommend a tag value for tagging the untagged "Refresh" button, such as a tag value of "refresh."

In the example of FIG. 4, the tag recommendation 404 is overlaid on the web page 146 as a window, and the tag recommendation 404 includes a selectable element (e.g., an "Tag" button) that, upon selection, allows an internal user 122 to add an analytics tag 136 associated with the page element (e.g., to add a tag 136 having a tag type of "TypeB" and a tag value of "refresh" to the "Refresh" button of the web page 146). In other examples, tag recommendation 404 may be presented in other ways, such as by highlighting the page elements with a particular color (e.g., green), presenting an icon (e.g., a green flag) next to the page element, or the like. Accordingly, the tag viewer 102, in some examples, can act as a tag recommender by scanning the web page 146 for untagged page elements to recommend opportunities for tagging those page elements. In some examples, the tag recommender 404 may be implemented with improperly-tagged page elements to recommend a particular tag type and/or tag value for tagging an improperly-tagged page element. In some examples, a user may provide user input to enable or disable a tag recommender, wherein the tag recommendation 404 is presented as an overlay on the web page 146 when the tag recommender is enabled and the tag recommendation 404 is not presented when the tag recommender is disabled. In some examples, such a tag recommender may be configurable through settings. For example, an internal user 122 may configure the tag recommender to be enabled and disabled via user input (e.g., clicking on a button).

In some examples, tag recommendations may be implemented as an automated tagging feature by the tagging component 134. For example, the data structure 148 for a web page, such as the web page 146 depicted in FIG. 4, can be analyzed to detect strings that correspond to particular page elements, such as section headers, buttons, links, etc.), and the reference information 406 for tagging page elements of web pages can be used to apply default analytics tags 136 (e.g., using a recommended tag type and/or tag value). These automatically applied tags can act as a starting point and an internal user 122 may review the automatically-applied tags 136 and modify the tags 136, if desired. In some examples, an internal user 122 may be notified about the tags 136 that are automatically applied to page elements so that the internal user 122 can review the tags 136. For example, a notification (e.g., an electronic mail (email), a push notification, a text message, etc.) can be sent to an account and/or a user device 124 of an internal user 122 to review analytics tags 136 that were recently applied to page elements of a web page by the tagging component 134 automatically. In other examples, the tag viewer 102 can present tags next to page elements that were recently tagged by the tagging component 134 automatically.

Figure 5:
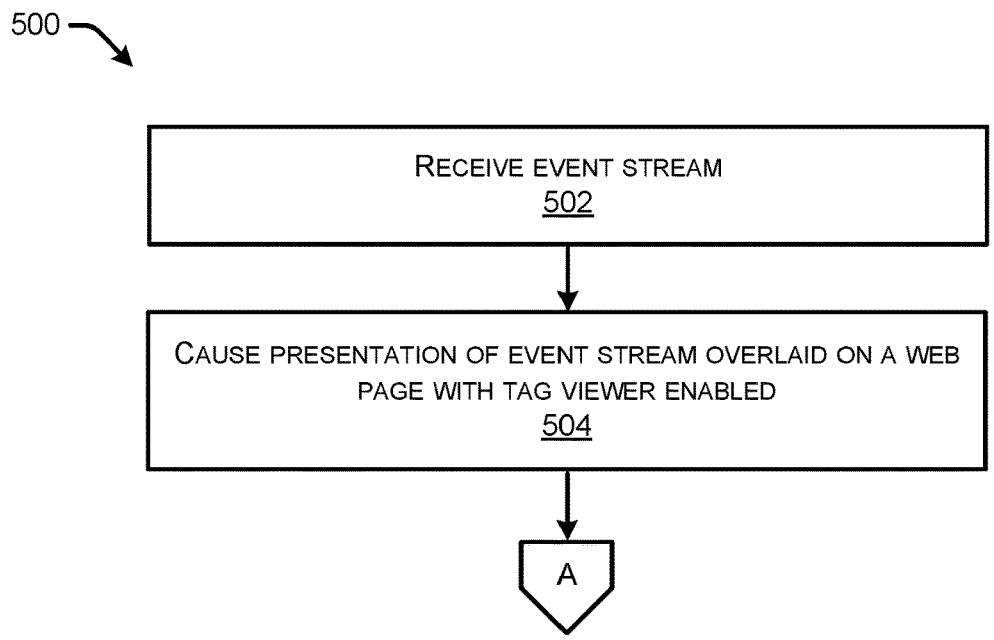
FIG. 5 illustrates a flow diagram of an example process for overlaying an event stream on a web page with a tag viewer enabled.

FIG. 5 illustrates a flow diagram of an example process 500 for overlaying an event stream 400 on a web page 146 with a tag viewer 102 enabled. For discussion purposes, the process 500 is described with reference to the previous figures. It is to be appreciated that the process 500 may be performed on a client-side device, a server-side device, or a combination thereof. For example, the process 500, or one or more steps thereof, may be performed on the client-side by a processor(s) 138 executing a browser extension, a plugin, a client application, or the like. Additionally, or alternatively, the process 500, or one or more steps thereof, may be performed on the server-side by a processor(s) executing computer-executable instructions on a server computer(s) (e.g., a server computer(s) of the service provider network 104).

At 502, a processor(s) (e.g., the processor(s) 138 of a user device 124) may receive a stream of events 400 representing customer interactions with one or more page elements of a web page 146. The stream of events 400 received at block 502 may pertain to event data 130 that is tracked by a tracker 128 and stored in the data store 132, after obtaining the consent of customers 108 to have their interactions tracked. In some examples, the stream of events 400 is received at block 502 by a user device 124 that is displaying the web page 146 with the tag viewer 102 enabled as a stream of the event data 130 that is associated with tagged page elements of the web page 146. In some examples, the tag viewer 102 executing on a user device 124 may subscribe to an event stream, and, based on the event subscription, the analytics service 126 may filter the events data 130 in the data store 132 on the tagged page elements for the web page 146 that is currently being displayed on the user device 124, and the user device 124 may receive the filtered event data 130 as the stream of events 400 at block 502.

At 504, the processor(s) may cause presentation, on a display(s) 142, of the stream of events 400 overlaid on the web page 146. An example of this is depicted in FIG. 4 where the stream of events 400 is overlaid on the web page 146 as a window. In some examples, the event stream 400 window is presented at block 504 in response to loading the web page 146, and the event stream 400 may be persistently presented as an overlay while the tag viewer 102 is enabled after loading the web page 146. In some examples, the event stream 400 window may be presented at block 504 as a pop-up window in response to a detected user input, such as user input corresponding to a pointer (e.g., a mouse pointer, a finger, an object, etc.) hovering over and/or selecting a button on the web page 146. In these examples, the event stream 400 presented at block 504 may include the filtered event data 130 pertaining to all or substantially all of the tagged page elements of the web page 146. In other examples, the event stream 400 may be filtered on particular tagged page elements of the web page 146 and presented at block 504 as a filtered set of event records. For example, if a pointer hovers over a particular page element that is tagged with an analytics tag 136, the event stream 400 window may pop-up as an overlay on the web page 146 at block 504 and may present event records associated with event data 130 corresponding to customer interactions with the page element over which the pointer is hovering. In some examples, the event stream 400 can be overlaid on the web page 146 at block 504 as a "heat map" that associates tracked event data 130 with tagged page elements in a spatial sense. For example, the event stream 400 may be presented at block 504 as icons that are overlaid on the web page 146 near (e.g., within a threshold distance from) tagged page elements, and in response to a pointer hovering over and/or selecting an icon next to a tagged page element, an event stream 400 window may pop-up as an overlay on the web page 146 at block 504 to present event records associated with event data 130 corresponding to customer interactions with that page element.

Figure 6:
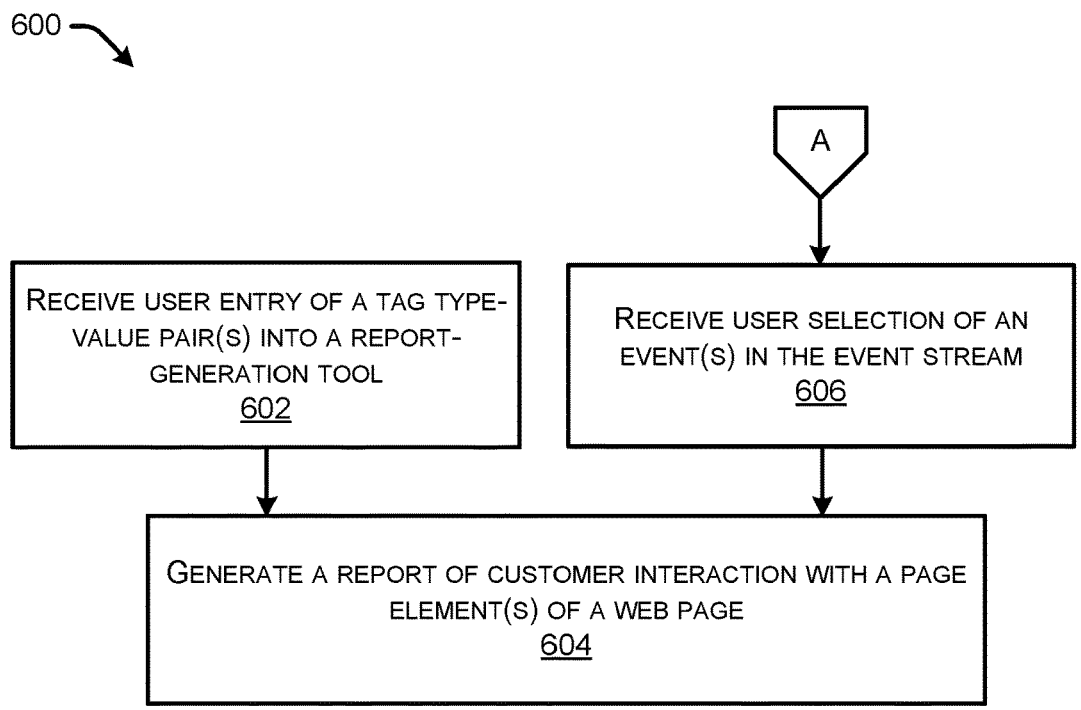
FIG. 6 illustrates a flow diagram of an example process for using a tag viewer to generate a report of customer interactions with a page element(s) of a web page.

FIG. 6 illustrates a flow diagram of an example process 600 for using a tag viewer 102 to generate a report of customer interactions with a page element(s) of a web page 146. For discussion purposes, the process 600 is described with reference to the previous figures. It is to be appreciated that the process 600 may be performed on a client-side device, a server-side device, or a combination thereof. For example, the process 600, or one or more steps thereof, may be performed on the client-side by a processor(s) 138 executing a browser extension, a plugin, a client application, or the like. Additionally, or alternatively, the process 600, or one or more steps thereof, may be performed on the server-side by a processor(s) executing computer-executable instructions on a server computer(s) (e.g., a server computer(s) of the service provider network 104).

At 602, a processor(s) (e.g., the processor(s) 138 of a user device 124) may receive (or detect) user entry of a tag type and/or a tag value into a report-generation tool, such as a separate web page for generating a report of customer interactions with a page element(s) of a web page 146. The user entry of the tag type and/or tag value may be received at block 602 as a request to generate a report of customer interactions with the page element(s) of the web page 146. For example, an internal user 122 may be viewing the web page 146 of a web page console with the tag viewer 102 enabled, as depicted in FIG. 2 or FIG. 4, and, using the annotations 202 overlaid on the web page 146, the internal user 122 can navigate another tab of the browser (or a separate instance of the browser) to a web page of a report-generation tool that is used to generate reports of customer interactions with web pages. The internal user 122, at block 602, can provide user input to enter the tag type(s) and tag value(s) that is/are included in the annotation(s) 202 for any tagged page element(s) presented by the tag viewer 102. In an illustrative example, if the internal user 122 is interested in event data 130 corresponding to customer interactions with the "Resources" section of the web page 146 depicted in FIG. 2, the user entry of the tag type and/or tag value included in the annotation 202(2) of FIG. 2 may be received at block 602. In some examples, user entry of additional information can be received at block 602, such as a user entry of a specific web-based console for a particular service (e.g., the relational database service) of the service provider network 104, and/or a time frame (e.g., the "last 5 days") to constrain the event data 130 included in the report to the specified time frame, and/or other parameters of the report that is to be generated.

At 604, the processor(s) may generate a report of customer interactions with the page element(s) of the web page 146 that are tagged with tags 136 having the tag type and/or tag value received at block 602. The report generated at block 604 may include information about how the tagged page element(s) was/were interacted with by customers 108 (e.g., a number of clicks, views, etc.). In the running example where the internal user 122 entered, at block 602, the tag type and/or tag value included in the annotation 202(2) of FIG. 2, the report generated at block 604 may include event data 130 pertaining to customer interactions with the "Resources" section of the web page 146 depicted in FIG. 2. In this manner, an internal user 122 can create reports of customer interactions with a web-based console efficiently and accurately using the process 600.

As shown by the off-page reference "A" in FIGS. 5 and 6, the process 600 may optionally continue from block 504 of the process 500 and begin at block 606, after an event stream 400 is overlaid on the web page 146. At 606, the processor(s) may receive a user selection of an event within the stream of events 400 that corresponds to the customer interactions with a particular tagged page element of the web page 146 presented in FIG. 4, for example. The user selection of the event within the event stream 400 may be received at block 606 as a request to generate a report of customer interactions with the page element(s) of the web page 146 that correspond(s) to the selected event.

Accordingly, the processor(s) may generate a report at block 604 based on the user selection of the event received at block 606, the report including information about how customers interacted with the tagged page element(s) corresponding to the selected event. In some examples, the report based on a selected event may be generated at block 604 by executing a script to automatically create the report on the basis of event data 130 that has been recorded by the analytics service 126. For example, the script may look up the event data 130 corresponding to the event selected by the internal user 122 and may generate a report based on looked up event data 130. Performing block 606 followed by block 604 may provide a streamlined way of generating a report of customer interactions with tagged page elements of a web page 146.

In some examples, a user can select a series of events in the event in the event stream 400 at block 606 to generate a report at block 604 that includes information about a particular flow of interest to understand how customers 108 are progressing from one page element to the next within a web page 146 and/or to understand how customers 108 are progressing from one web page to the next. For example, the report generated at block 604 may be a funnel report that pertains to a series of sequential events (e.g., event 1, event 2, event 3, etc.), and the funnel report may illustrate, for example, that 100% of customers 108 clicked on a first page element of the web page 146, and that 80% of those customers 108 clicked on a second page element of the web page 146 after clicking on the first page element of the web page 146, and so on and so forth. This type of funnel report may inform a consumer of the report about customers 108 abandoning a particular interaction (e.g., a click of a page element) in a sequence of interactions before completing the particular interaction.

Figure 7:
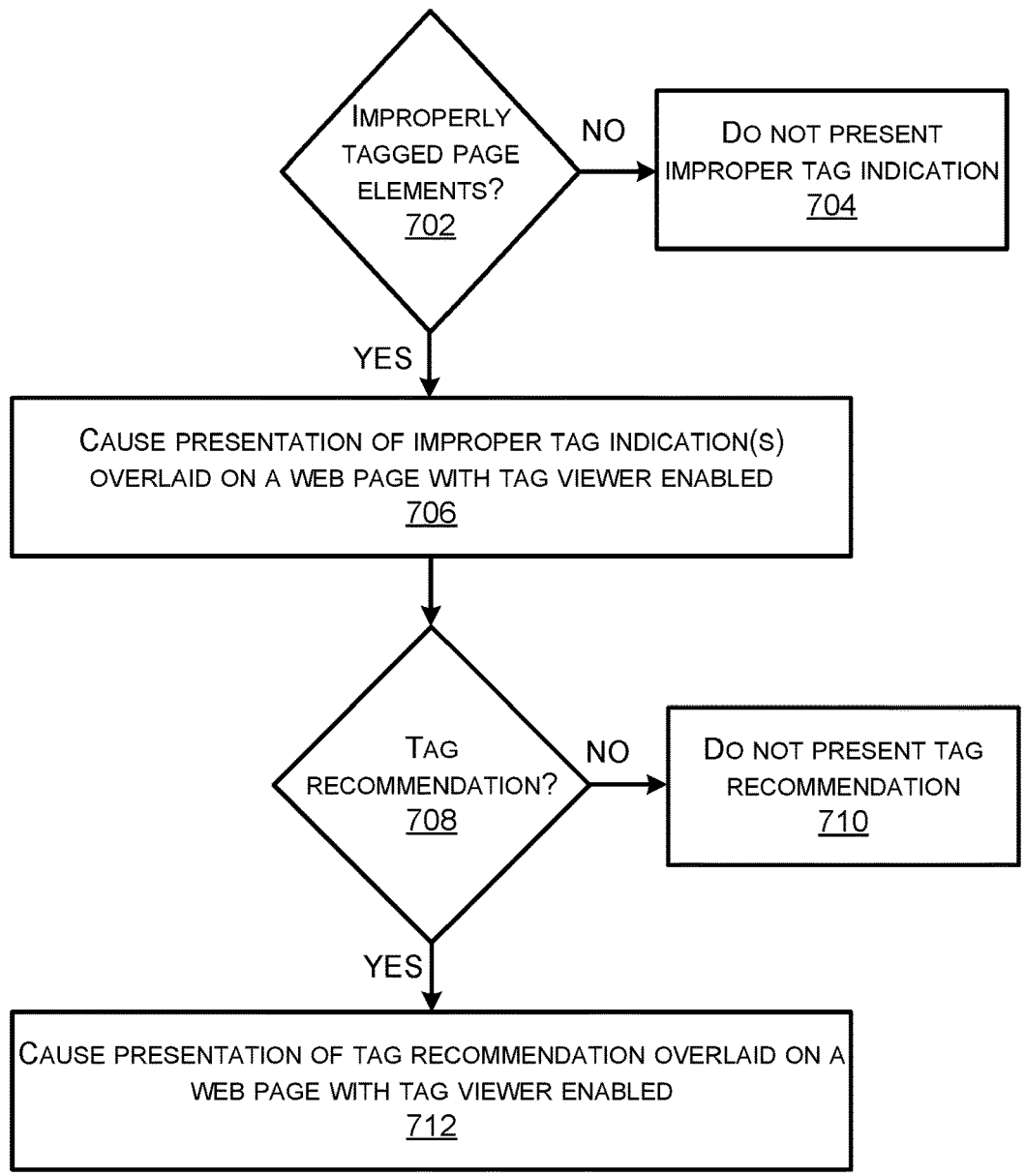
FIG. 7 illustrates a flow diagram of an example process for determining whether to present, on a web page with a tag viewer enabled: (i) an indication of an improperly tagged page element(s) and/or (ii) a tag recommendation(s).

FIG. 7 illustrates a flow diagram of an example process 700 for determining whether to present, on a web page 146 with a tag viewer 102 enabled: (i) an indication 402 of an improperly tagged page element(s) and/or (ii) a tag recommendation(s) 404. For discussion purposes, the process 700 is described with reference to the previous figures. It is to be appreciated that the process 700 may be performed on a client-side device, a server-side device, or a combination thereof. For example, the process 700, or one or more steps thereof, may be performed on the client-side by a processor(s) 138 executing a browser extension, a plugin, a client application, or the like. Additionally, or alternatively, the process 700, or one or more steps thereof, may be performed on the server-side by a processor(s) executing computer-executable instructions on a server computer(s) (e.g., a server computer(s) of the service provider network 104).

At 702, a processor(s) (e.g., the processor(s) 138 of a user device 124) may determine, based at least in part on reference information 406 for tagging page elements, whether a page element(s) of a web page 146 is improperly tagged. As noted above, such reference information 406 may be built over time as internal users 122 use the tagging component 134 to tag page elements of web pages with analytics tags 136. For example, as page elements are tagged, tagged page elements may be grouped into groups of similar page elements (e.g., based on aspects or features of the page elements), and the tags 136 of each group of tagged page elements may be analyzed to determine a common attribute of the tags 136. Accordingly, the reference information 406 for tagging page elements may be used to identify tagged page elements on a given web page 146, and to determine whether a tag 136 associated with the identified page element includes an attribute in common with similar page elements of other web pages 146. For example, the reference information 406 for tagging page elements may indicate that other web pages include buttons that are similar to the "Restore from Storage" button of the web page 146 depicted in FIG. 4, and most of the analytics tags 136 associated with those buttons may have a tag type of "TypeB". In this example, if the page element (e.g., the "Restore from Storage" button) is properly tagged (e.g., with a tag 136 having a tag type of "TypeB"), the process 700 may follow the NO route from block 702 to block 704, where the processor(s) may refrain from presenting an indication of an improperly-tagged page element. If, on the other hand, the processor(s) determines, at block 702, that the page element(s) (e.g., the "Restore from Storage" button) of the web page 146 is improperly tagged (e.g., with a tag 136 having a tag type of "TypeA," as depicted in FIG. 4), the process 700 may follow the YES route from block 702 to block 706.

At 706, the processors(s) may cause presentation, on a display(s) 142, of an indication(s) 402 overlaid on the web page 146 and in association with (e.g., within a threshold distance of) the improperly-tagged page element(s). This indication(s) 402 presented at block 706 may indicate that a page element(s) is/are improperly tagged. In some examples, the indication(s) 402 presented at block 706 includes a selectable element(s) (e.g., an "Edit" button(s)) that, upon selection, allows an internal user 122 to edit the analytics tag(s) 136 associated with the improperly-tagged page element(s) (e.g., to change the tag type and/or the tag value). In other examples, the indication 402 of an improperly-tagged page element may be presented at block 706 in other ways, such as by highlighting the page elements with a particular color (e.g., red), presenting an icon (e.g., a red flag) next to the page element, or the like.

At 708, the processor(s) may determine, based at least in part on the reference information 406 for tagging page elements, whether to recommend tagging a page element(s). This determination at block 708 may include determining whether a page element(s) of the web page 146 is a type of page element that has been tagged with a particular tag type and/or a particular tag value. The page elements evaluated at block 708 may include untagged page elements and/or improperly tagged page elements. If the processor(s) determines to not recommend tagging a page element(s) at block 708, the process 700 may follow the NO route from block 708 to block 710, where the processor(s) may refrain from presenting a tag recommendation. If, on the other hand, the processor(s) determines, at block 708, to recommend tagging a page element(s) of the web page 146, the process 700 may follow the YES route from block 708 to block 712.

At 712, the processors(s) may cause presentation, on a display(s) 142, of a tag recommendation(s) 404 overlaid on the web page 146 and in association with (e.g., within a threshold distance of) an untagged page element(s) and/or an improperly-tagged page element(s). This tag recommendation(s) 404 presented at block 712 may recommend to tag the page element(s) with a tag 136 having a particular tag type and/or a particular tag value determined at block 708. That is, based on other page elements of the same or similar type having been frequently tagged with tags 136 of a particular tag type and/or a particular tag value, the tag recommendation(s) 404 presented at block 712 may recommend tagging the page element(s) with a tag(s) 136 having the particular tag type and/or the particular tag value. In some examples, the tag recommendation(s) 404 presented at block 712 includes a selectable element (e.g., an "Tag" button) that, upon selection, allows an internal user 122 to add an analytics tag 136 associated with the page element (e.g., to add a tag 136 having a tag type of "TypeB" and a tag value of "refresh" to the "Refresh" button of the web page 146 depicted in FIG. 4). In other examples, tag recommendation 404 may be presented at block 712 in other ways, such as by highlighting the page elements with a particular color (e.g., green), presenting an icon (e.g., a green flag) next to the page element, or the like.

Figure 8:
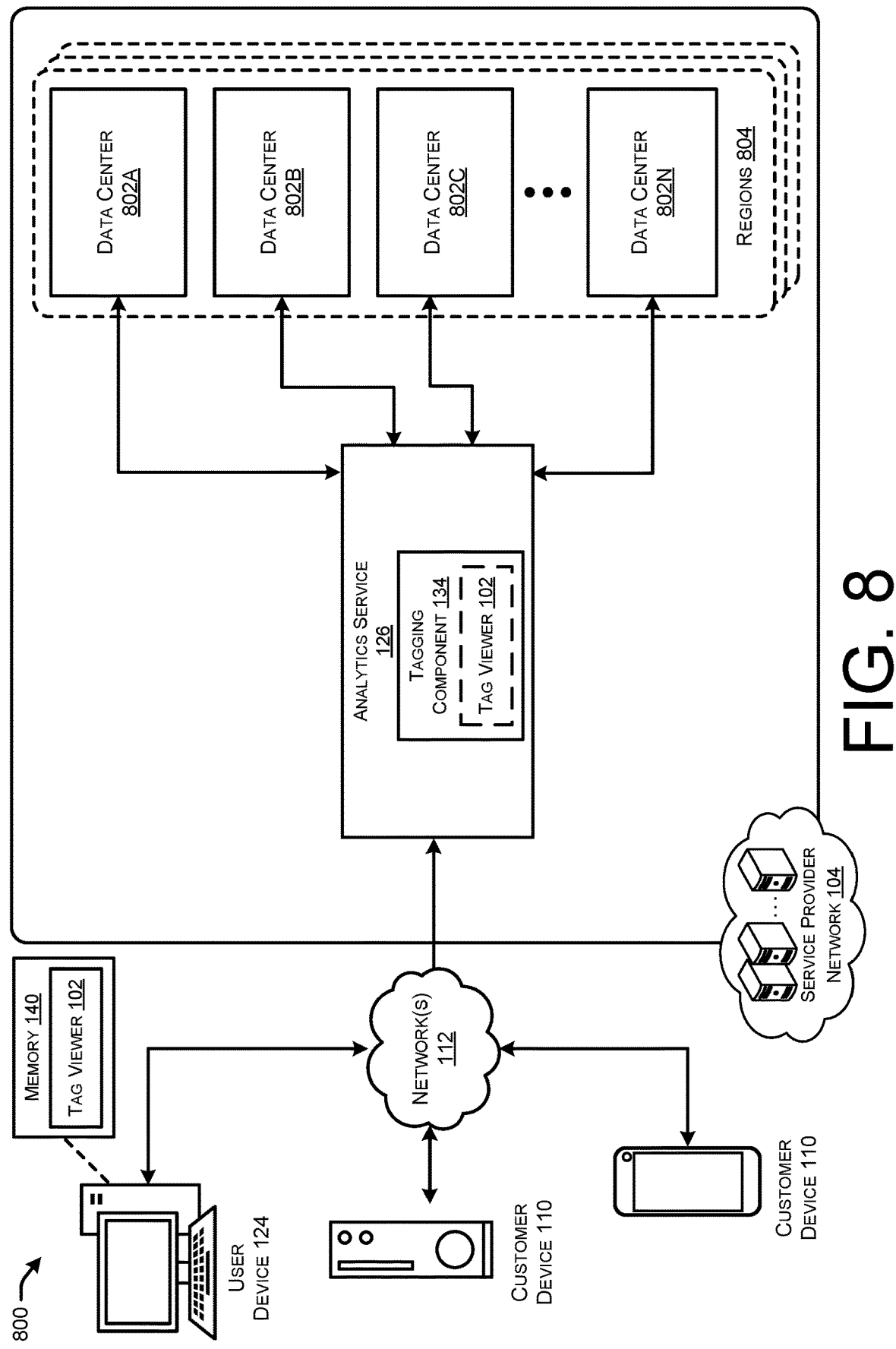
FIG. 8 is a system and network diagram that shows an illustrative operating environment that includes a service provider network that can be configured to implement aspects of the functionality described herein.

FIG. 8 is a system and network diagram that shows an illustrative operating environment 800 that includes a service provider network 104 and a user device 124 that can be configured to implement aspects of the functionality described herein. The service provider network 104 can provide computing resources 120, such as data processing resources (e.g., VM instances), database resources (e.g., database tables), storage resources (e.g., storage containers), networking resources, queues, etc. on a permanent or an as-needed basis. Among other types of functionality, the computing resources 120 provided by the service provider network 104 may be utilized to implement the various services and components described above.

Each type of computing resource 120 provided by the service provider network 104 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 104 can also be configured to provide other types of computing resources not mentioned specifically herein.

The computing resources 120 provided by the service provider network 104 may be enabled in one embodiment by one or more data centers 802A-802N (which might be referred to herein singularly as "a data center 802" or in the plural as "the data centers 802"). The data centers 802 are facilities utilized to house and operate computer systems and associated components. The data centers 802 typically include redundant and backup power, communications, cooling, and security systems. The data centers 802 can also be located in geographically disparate locations, or regions 804. One illustrative embodiment for a data center 802 that can be utilized to implement the technologies disclosed herein will be described below with regard to FIG. 9.

The customers 108 that utilize the service provider network 104 may access the computing resources 120 provided by the service provider network 104 over any wired and/or wireless network(s) 112, which can be a wide area communication network ("WAN"), such as the Internet, an intranet or an Internet service provider ("ISP") network or a combination of such networks. For example, and without limitation, a customer device 110 operated by customer 108 of the service provider network 104 may be utilized to access the service provider network 104 by way of the network(s) 112. It should be appreciated that a local-area network ("LAN"), the Internet, or any other networking topology known in the art that connects the data centers 802 to remote clients and other users can be utilized. It should also be appreciated that combinations of such networks can also be utilized. As illustrated, the analytics service 126, including the tagging component 134, may be configured to implement a tag viewer 102, as described herein. For example, a tag viewer 102 may be installed on a user device 124 of an internal user 122, such as by installing the tag viewer 102 on the user device 124 as a browser extension, a plugin, and/or a client application. Accordingly, internal users 122 that utilize the analytics service 126 may enable the tag viewer 102 while accessing web pages of web-based consoles for services of the service provider network 104, such access being by way of the network(s) 112.

Figure 9:
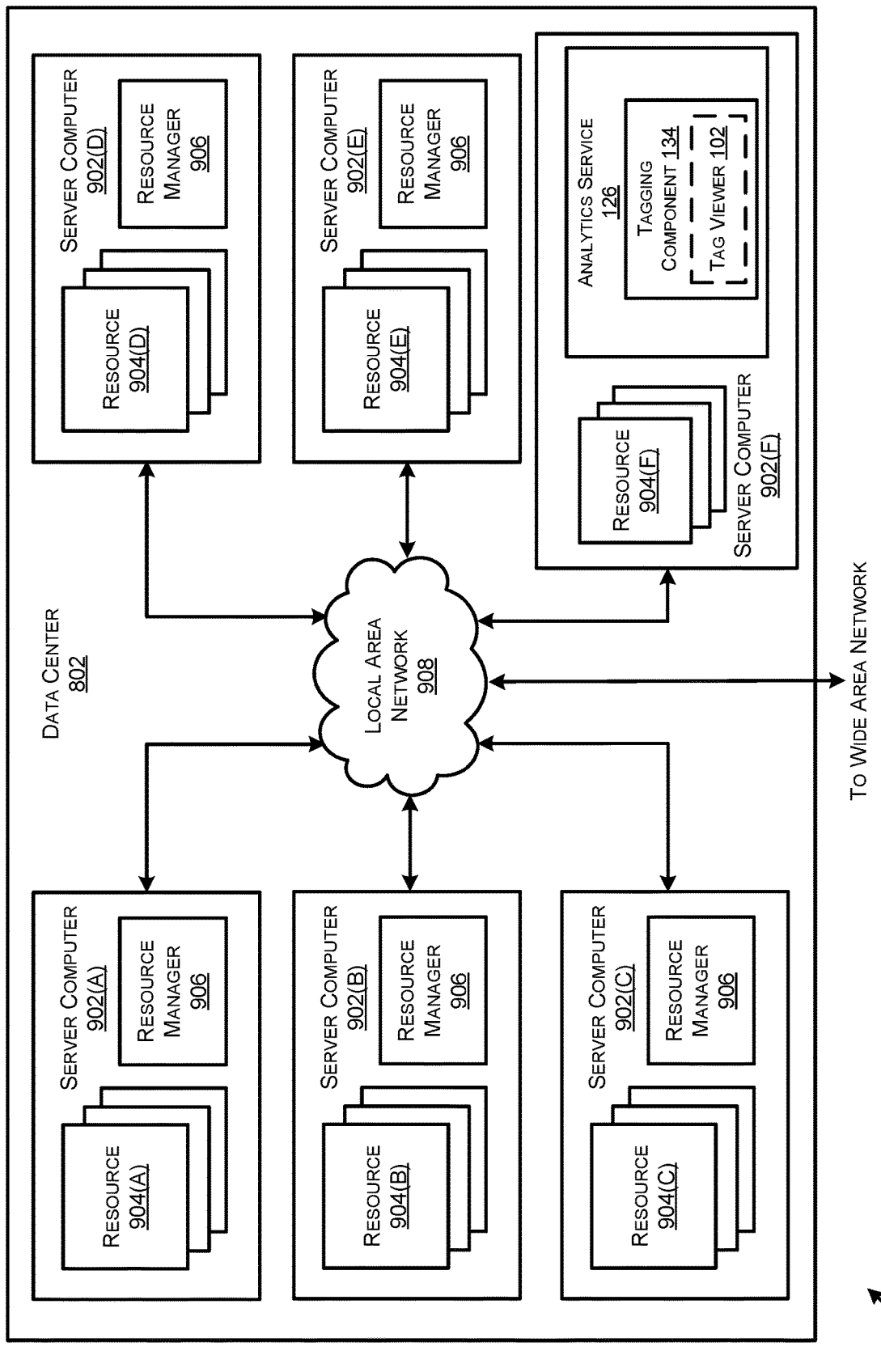
FIG. 9 is a computing system diagram illustrating a configuration for a data center that can be utilized to implement aspects of the technologies disclosed herein.

FIG. 9 is a computing system diagram 900 that illustrates one configuration for a data center 802 that implements aspects of the technologies disclosed herein. The example data center 802 shown in FIG. 9 includes several server computers 902A-902F (which might be referred to herein singularly as "a server computer 902" or in the plural as "the server computers 902") for providing computing resources 904A-904F. In some examples, the resources 904 may represent the computing resources 120 described herein. In some examples, the resources 904 and the server computers 902 may include, be included in, or correspond to, the computing resource network 118 described herein.

The server computers 902 can be standard tower, rack-mount, or blade server computers configured appropriately for providing the computing resources described herein (illustrated in FIG. 9 as the computing resources 904A-904E). The computing resources provided by the service provider network 104 can be virtual computing resources 120 (e.g., data processing resources, such as VM instances, database resources, storage resources, networking resources, queues, etc.) or hardware computing systems, database clusters, computing clusters, storage clusters, data storage resources, database resources, networking resources, and others. Some of the servers 902 can also be configured to execute a resource manager 906 capable of instantiating and/or managing the computing resources. In the case of VM instances, for example, the resource manager 906 can be a hypervisor or another type of program configured to enable the execution of multiple VM instances on a single server computer 902. Server computers 902 in the data center 802 can also be configured to provide network services and other types of services.

In the example data center 802 shown in FIG. 9, an appropriate LAN 908 is also utilized to interconnect the server computers 902A-902F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 802A-802N, between each of the server computers 902A-902F in each data center 802, and, potentially, between computing resources in each of the server computers 902. It should be appreciated that the configuration of the data center 802 described with reference to FIG. 9 is merely illustrative and that other implementations can be utilized.

The data center 802 shown in FIG. 9 also includes a server computer 902F that can execute some or all of the software components described above. For example, and without limitation, the server computer 902F (and the other server computers 902) can generally correspond to a server/computing device configured to execute components including, without limitation, the analytics service 126 that includes the tagging component 134 for implementing the tag viewer 102, as described herein, and/or the other software components described above. The server computer 902F can also be configured to execute other components and/or to store data for providing some or all of the functionality described herein. In this regard, it should be appreciated that the components illustrated in FIG. 9 as executing on the server computer 902F can execute on many other physical or virtual servers in the data centers 802 in various embodiments. Thus, the data center 802 in FIG. 9 may also include a plurality of server computers 902 that execute a fleet of computing resources (e.g., VM instances). It is to be appreciated that the host computers 116 depicted in FIG. 1 may be any of the server computers 902 of FIG. 9. As such, the host computers 116 of FIG. 1 may be within the same data center 802.

Figure 10:
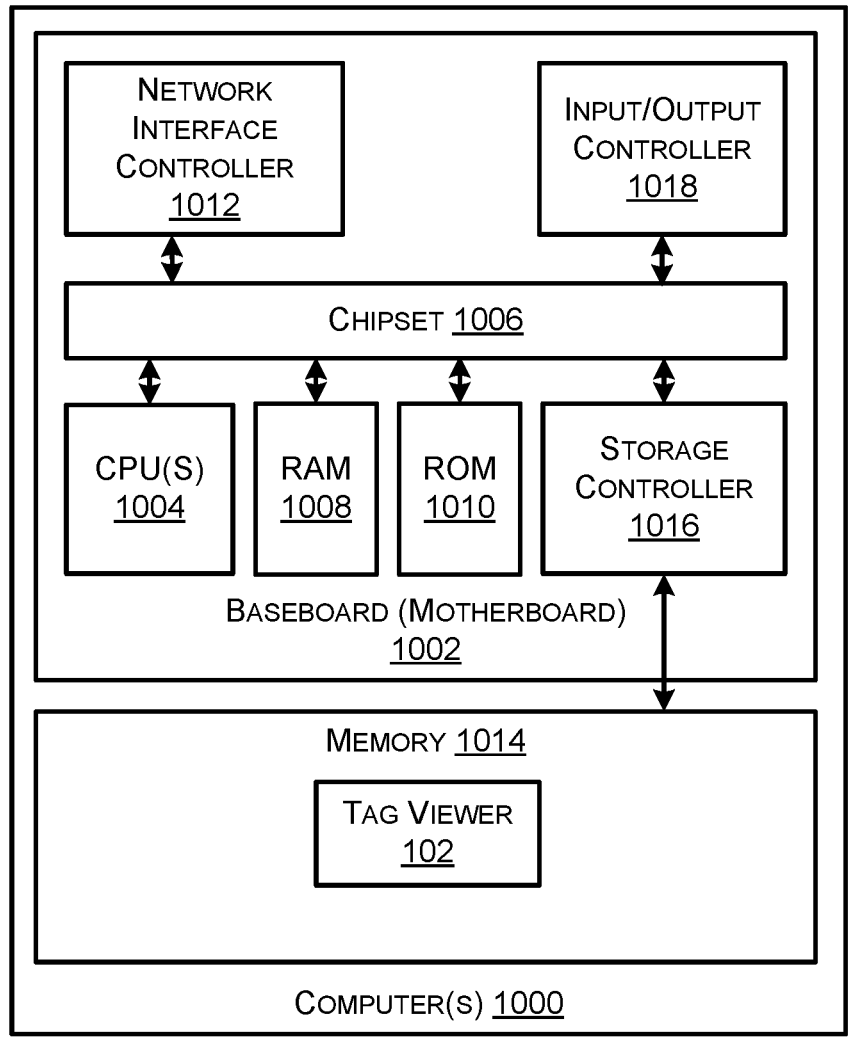
FIG. 10 is a computer architecture diagram showing an illustrative computer hardware architecture for implementing a computing device that can be utilized to implement aspects of the various technologies presented herein.

FIG. 10 shows an example computer architecture for a computer(s) 1000 capable of executing program components for implementing the functionality described above. The computer architecture shown in FIG. 10 illustrates a server computer, workstation, desktop computer, laptop, tablet, network appliance, e-reader, smartphone, or other computing device, and can be utilized to execute any of the software components presented herein. In some examples, the computer(s) 1000 may correspond to one or more computing devices that implements the components and/or services described herein, including, without limitation, the tag viewer 102. Accordingly, in at least one implementation, the computer(s) 1000 may represent a user device 124 with the tag viewer 102 installed thereon. In other implementations, the computer(s) 1000 may represent a server computer(s) that implements the tag viewer 102 remotely from a user device 124, or the computer(s) 1000 may represent both a server computer and a client computer to distribute the functionality described herein amongst client side and server side processes.

The computer(s) 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer(s) 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a random-access memory (RAM) 1008, used as the main memory in the computer(s) 1000. The chipset 1006 can further provide an interface to a computer-readable storage medium such as a read-only memory ("ROM") 1010 or non-volatile RAM ("NVRAM") for storing basic routines that help to startup the computer(s) 1000 and to transfer information between the various components and devices. The ROM 1010 or NVRAM can also store other software components necessary for the operation of the computer(s) 1000 in accordance with the configurations described herein.

The computer(s) 1000 can operate in a networked environment using logical connections to remote computing devices and computer systems through a network, such as the network 808. The chipset 1006 can include functionality for providing network connectivity through a network interface controller (NIC) 1012, such as a gigabit Ethernet adapter. The NIC 1012 is capable of connecting the computer(s) 1000 to other computing devices over the network 908 (or 112). It should be appreciated that multiple NICs 1012 can be present in the computer(s) 1000, connecting the computer to other types of networks and remote computer systems.

The computer(s) 1000 can be connected to a memory(ies) 1014 (e.g., mass storage device, etc.) that provides non-volatile storage for the computer. The memory 1014 can store an operating system, programs, and/or components including, without limitation, the tag viewer 102, as described herein, and data, which have been described in greater detail herein. The memory 1014 can be connected to the computer(s) 1000 through a storage controller 1016 connected to the chipset 1006. The memory 1014 can consist of one or more physical storage units. The storage controller 1016 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer(s) 1000 can store data on the memory 1014 by transforming the physical state of the physical storage units to reflect the information being stored. The specific transformation of physical state can depend on various factors, in different embodiments of this description. Examples of such factors can include, but are not limited to, the technology used to implement the physical storage units, whether the memory 1014 is characterized as primary or secondary storage, and the like.

For example, the computer(s) 1000 can store information to the memory 1014 by issuing instructions through the storage controller 1016 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer(s) 1000 can further read information from the memory 1014 by detecting the physical states or characteristics of one or more particular locations within the physical storage units.

In addition to the memory 1014 described above, the computer(s) 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer(s) 1000. In some examples, the operations performed by the service provider network 104, and or any components and/or services included therein, may be supported by one or more devices similar to computer(s) 1000. Stated otherwise, some or all of the operations performed by the service provider network 104, and/or any components and/or services included therein, may be performed by one or more computer devices 1000 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion. The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof.

As mentioned briefly above, the memory 1014 can store an operating system utilized to control the operation of the computer(s) 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The memory 1014 can store other system or application programs and data utilized by the computer(s) 1000.

In one embodiment, the memory 1014 or other computer-readable storage media is encoded with computer-executable instructions which, when loaded into the computer(s) 1000, transform the computer from a general-purpose computing system into a special-purpose computer capable of implementing the embodiments described herein. These computer-executable instructions transform the computer(s) 1000 by specifying how the CPUs 1004 transition between states, as described above. According to one embodiment, the computer(s) 1000 has access to computer-readable storage media storing computer-executable instructions which, when executed by the computer(s) 1000, perform the various processes described above with regard to FIGS. 3 and 5-7. The computer(s) 1000 can also include computer-readable storage media having instructions stored thereupon for performing any of the other computer-implemented operations described herein.

The computer(s) 1000 can also include one or more input/output controllers 1018 for receiving and processing input from a number of input devices, such as a keyboard, a mouse, a touchpad, a touch screen, an electronic stylus, or other type of input device. Similarly, an input/output controller 1018 can provide output to a display, such as a computer monitor, a flat-panel display, a digital projector, a printer, or other type of output device. It will be appreciated that the computer(s) 1000 might not include all of the components shown in FIG. 10, can include other components that are not explicitly shown in FIG. 10, or might utilize an architecture completely different than that shown in FIG. 10.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving, by one or more processors, a data structure associated with a web page based at least in part on a request to display the web page on a display of a user device within a browser or a client application, wherein the web page represents a web-based console used by customers to access a network-based service of a service provider network;
   determining, by the one or more processors, and based at least in part on identifying tags within the data structure, page elements of the web page that are tagged with the tags, the page elements including at least a first page element and a second page element; and causing, by the one or more processors, presentation, on
the display, of content overlaid on the web page within
the browser or the client application, the content comprising:
- a first container presented around the first page element;
- a first annotation presented in association with the first page element, the first annotation including a first tag type and a first tag value;
- a second container presented around the second page element; and
- a second annotation presented in association with the second page element, the second annotation including a second tag type that is different than the first tag type and a second tag value, at least one of the first container or the first annotation being presented in a first manner based at least in part on the first tag type and at least one of the second container or the second annotation being presented in a second manner different than the first manner based at least in part on the second tag type.

2. The method of claim 1, wherein the second container is presented within the first container based at least in part on the second tag type being different than the first tag type.

3. The method of claim 1, wherein, based at least in part on the second tag type being different than the first tag type:
the first container and the first annotation are presented in at least one of a first color or a first style; and
the second container and the second annotation are presented in at least one of a second color different than the first color or a second style different than the first style.

4. A method comprising:
receiving, by one or more processors, a data structure associated with a web page based at least in part on a request to display the web page, wherein the web page is associated with a service of a service provider network;
determining, by the one or more processors, and based at least in part on the data structure, a first page element of the web page that is tagged with a first tag and a second page element of the web page that is tagged with a second tag that is different than the first tag; and
causing, by the one or more processors, presentation, on a display, of content overlaid on the web page, the content comprising:
- a first container presented around the first page element;
- a first annotation presented in association with the first page element;
- a second container presented around the second page element; and
- a second annotation presented in association with the second page element, at least one of the first container or the first annotation being presented in a first manner based at least in part on a first tag type associated with the first container or the first annotation and at least one of the second container or the second annotation being presented in a second manner, different than the first manner, based at least in part on a second tag type that is associated with the second container or the second annotation and that is different than the first tag type.

5. The method of claim 4, wherein the determining of the first page element and the second page element based at least in part on the data structure comprises:
submitting a query for page elements of the web page that are tagged within the data structure; and
receiving a list of the page elements based at least in part on the submitting of the query, wherein the list includes the first page element and the second page element.

6. The method of claim 4, further comprising determining, based at least in part on the first tag type, at least one of a color or a style of the first container, wherein the first container is presented in at least one of the color or the style.

7. The method of claim 4, further comprising receiving a stream of events representing customer interactions with one or more page elements of the web page, wherein the content further comprises the stream of events.

8. The method of claim 7, further comprising:
receiving a user selection of an event within the stream of events that corresponds to customer interactions with the first page element or the second page element; and
generating a report of the customer interactions with the first page element or the second page element based at least in part on the receiving of the user selection of the event.

9. The method of claim 4, further comprising receiving a second request to enable a tag viewer in association with the web page, wherein the determining of the first page element and the second page element and the causing of the presentation of the content is in response to the receiving of the second request.

10. The method of claim 4, further comprising determining, based at least in part on reference information for tagging page elements, that a third page element of the web page is improperly tagged, wherein the content further comprises an indication presented in association with the third page element, the indication indicating that the third page element is improperly tagged.

11. The method of claim 4, further comprising determining, based at least in part on reference information for tagging page elements, that a third page element of the web page is a type of page element that has been tagged with at least one of a particular tag type or a particular tag value, wherein the content further comprises a recommendation presented in association with the third page element, the recommendation recommending to tag the third page element with a third tag having at least one of the particular tag type or the particular tag value.

12. The method of claim 4, wherein:
the request to display the web page comprises a request to display the web page within a browser; and
the determining of the first page element and the second page element and the causing of the presentation of the content is performed by a browser extension of the browser.

13. A system comprising:
one or more processors; and
memory storing computer-executable instructions that, when executed by the one or more processors, cause the one or more processors to:
analyze data associated with a web page based at least in part on a request to display the web page, wherein the web page is associated with a service of a service provider network;
determine, based at least in part on analyzing the data, a first page element of the web page that is tagged with a first tag and a second page element of the web page that is tagged with a second tag that is different than the first tag; and
cause presentation, on a display, of content overlaid on the web page, the content comprising:
a first container presented around the first page element;

a first annotation presented in association with the first page element;

a second container presented around the second page element; and a second annotation presented in association with the second page element, at least one of the first container or the first annotation being presented in a first manner based at least in part on a first tag type associated with the first container or the first annotation and at least one of the second container or the second annotation being presented in a second manner, different than the first manner, based at least in part on a second tag type that is associated with the second container or the second annotation and that is different than the first tag type.

14. The system of claim 13, wherein determining the first page element and the second page element based at least in part on the analyzing of the data comprises:

submitting a query for page elements of the web page that are tagged within a data structure; and receiving a list of the page elements based at least in part on the submitting of the query, wherein the list includes the first page element and the second page element.

15. The system of claim 13, wherein:

the computer-executable instructions, when executed by the one or more processors, further cause the one or more processors to determine, based at least in part on the first tag type, at least one of a color or a style of the first container; and the first container is presented around the first page element in at least one of the color or the style.

16. The system of claim 13, wherein:

the computer-executable instructions, when executed by the one or more processors, further cause the one or more processors to receive a stream of events representing customer interactions with one or more page elements of the web page; and the content further comprises the stream of events.

17. The system of claim 13, wherein the computer-executable instructions, when executed by the one or more processors, further cause the one or more processors to:

receive user entry of the first tag type into a second web page for generating reports; and generating a report of customer interactions with the first page element based at least in part on receiving the user entry of the first tag type in the second web page.

18. The system of claim 13, wherein the computer-executable instructions, when executed by the one or more processors, further cause the one or more processors to receive a second request to enable a tag viewer in association with the web page, wherein determining the first page element and the second page element and causing the presentation of the content is in response to receiving the second request.

19. The system of claim 13, wherein:

the computer-executable instructions, when executed by the one or more processors, further cause the one or more processors to determine, based at least in part on reference information for tagging page elements, that a third page element of the web page is improperly tagged; and the content further comprises an indication presented in association with the third page element, the indication indicating that the third page element is improperly tagged.

20. The system of claim 13, wherein:

the computer-executable instructions, when executed by the one or more processors, further cause the one or more processors to determine, based at least in part on reference information for tagging page elements, that a third page element of the web page is a type of page element that has been tagged with at least one of a particular tag type or a particular tag value; and the content further comprises a recommendation presented in association with the third page element, the recommendation recommending to tag the third page element with a third tag having the at least one of the particular tag type or the particular tag value.

* * * * *